(12) United States Patent
Hubbard

(10) Patent No.: US 8,015,174 B2
(45) Date of Patent: Sep. 6, 2011

(54) SYSTEM AND METHOD OF CONTROLLING ACCESS TO THE INTERNET

(75) Inventor: Dan Hubbard, Carlsbad, CA (US)

(73) Assignee: Websense, Inc., San Diego, CA (US)

( * ) Notice: Subject to any disclaimer, the term of this patent is extended or adjusted under 35 U.S.C. 154(b) by 300 days.

(21) Appl. No.: 11/680,484

(22) Filed: Feb. 28, 2007

(65) Prior Publication Data

US 2008/0208868 A1 Aug. 28, 2008

(51) Int. Cl.
*G06F 17/30* (2006.01)
(52) U.S. Cl. .................. 707/709; 707/781; 726/25
(58) Field of Classification Search .............. 707/694, 707/781–784, E17.008, 999.003–999.01; 726/22–30
See application file for complete search history.

(56) References Cited

U.S. PATENT DOCUMENTS

| | | | |
|---|---|---|---|
| 4,423,414 A | 12/1983 | Bryant et al. | |
| 4,734,036 A | 3/1988 | Kasha | |
| 4,941,084 A | 7/1990 | Terada et al. | |
| 5,408,642 A | 4/1995 | Mann | |
| 5,493,692 A | 2/1996 | Theimer et al. | |
| 5,541,911 A | 7/1996 | Nilakantan et al. | |
| 5,548,729 A | 8/1996 | Akiyoshi et al. | |
| 5,555,376 A | 9/1996 | Theimer et al. | |
| 5,581,703 A | 12/1996 | Baugher et al. | |
| 5,586,121 A | 12/1996 | Moura et al. | |
| 5,606,668 A | 2/1997 | Shwed | |
| 5,648,965 A | 7/1997 | Thadani et al. | |
| 5,678,041 A | 10/1997 | Baker et al. | |
| 5,682,325 A | 10/1997 | Lightfoot et al. | |
| 5,696,486 A | 12/1997 | Poliquin et al. | |
| 5,696,898 A | 12/1997 | Baker et al. | |
| 5,699,513 A | 12/1997 | Feigen et al. | |
| 5,706,507 A | 1/1998 | Schloss | |
| 5,712,979 A | 1/1998 | Graber et al. | |
| 5,720,033 A | 2/1998 | Deo | |
| 5,724,576 A | 3/1998 | Letourneau | |
| 5,742,759 A | 4/1998 | Nessett et al. | |
| 5,758,257 A | 5/1998 | Herz et al. | |
| 5,768,519 A | 6/1998 | Swift et al. | |
| 5,774,668 A | 6/1998 | Choquier | |

(Continued)

FOREIGN PATENT DOCUMENTS

EP 0 658 837 A2 12/1994

(Continued)

OTHER PUBLICATIONS

International Search Report dated Jul. 22, 2008 for International Patent Application No. PC77US2008/052522.

(Continued)

*Primary Examiner* — Mohammad Ali
*Assistant Examiner* — Amanda Willis
(74) *Attorney, Agent, or Firm* — Knobbe Martens Olson & Bear LLP

(57) ABSTRACT

Certain embodiments provide for systems and methods of monitoring data sent from a requested device to a requesting device and removing certain portions of the data such as malicious or otherwise objectionable content. Objectionable content may include, for example, potentially executable web content. In certain embodiments, the systems and methods remove uniform resource locator (URL) links from the intercepted data which point to web pages having malicious or otherwise objectionable content.

18 Claims, 18 Drawing Sheets

U.S. PATENT DOCUMENTS

| | | |
|---|---|---|
| 5,781,801 A | 7/1998 | Flanagan et al. |
| 5,787,253 A | 7/1998 | McCreery et al. |
| 5,787,427 A | 7/1998 | Benantar et al. |
| 5,796,944 A | 8/1998 | Hill et al. |
| 5,799,002 A | 8/1998 | Krishnan |
| 5,801,747 A | 9/1998 | Bedard |
| 5,826,014 A | 10/1998 | Coley et al. |
| 5,828,833 A | 10/1998 | Belville et al. |
| 5,828,835 A | 10/1998 | Isfeld et al. |
| 5,832,212 A | 11/1998 | Cragun et al. |
| 5,832,228 A | 11/1998 | Holden et al. |
| 5,832,503 A | 11/1998 | Malik et al. |
| 5,835,722 A | 11/1998 | Bradshaw et al. |
| 5,835,726 A | 11/1998 | Shwed et al. |
| 5,842,040 A | 11/1998 | Hughes et al. |
| 5,848,233 A | 12/1998 | Radia et al. |
| 5,848,412 A | 12/1998 | Rowland et al. |
| 5,850,523 A | 12/1998 | Gretta, Jr. |
| 5,855,020 A | 12/1998 | Kirsch |
| 5,864,683 A | 1/1999 | Boebert et al. |
| 5,884,033 A | 3/1999 | Duvall et al. |
| 5,884,325 A | 3/1999 | Bauer et al. |
| 5,889,958 A | 3/1999 | Willens |
| 5,892,905 A | 4/1999 | Brandt et al. |
| 5,896,502 A | 4/1999 | Shieh et al. |
| 5,898,830 A | 4/1999 | Wesinger et al. |
| 5,899,991 A * | 5/1999 | Karch ............................... 707/5 |
| 5,899,995 A | 5/1999 | Millier et al. |
| 5,911,043 A | 6/1999 | Duffy et al. |
| 5,933,827 A | 8/1999 | Cole et al. |
| 5,937,404 A * | 8/1999 | Csaszar et al. ..................... 707/9 |
| 5,941,947 A | 8/1999 | Brown et al. |
| 5,944,794 A | 8/1999 | Okamoto et al. |
| 5,950,195 A | 9/1999 | Stockwell et al. |
| 5,958,015 A | 9/1999 | Dascalu |
| 5,961,591 A | 10/1999 | Jones et al. |
| 5,968,176 A | 10/1999 | Nessett et al. |
| 5,978,807 A | 11/1999 | Mano et al. |
| 5,983,270 A | 11/1999 | Abraham et al. |
| 5,987,606 A | 11/1999 | Cirasole et al. |
| 5,987,611 A | 11/1999 | Freund |
| 5,991,807 A | 11/1999 | Schmidt et al. |
| 5,996,011 A | 11/1999 | Humes |
| 5,999,929 A | 12/1999 | Goodman |
| 6,052,723 A | 4/2000 | Ginn |
| 6,052,730 A * | 4/2000 | Felciano et al. ............... 709/225 |
| 6,055,564 A | 4/2000 | Phaal |
| 6,065,056 A | 5/2000 | Bradshaw et al. |
| 6,065,059 A | 5/2000 | Shieh et al. |
| 6,070,242 A | 5/2000 | Wong et al. |
| 6,073,239 A | 6/2000 | Dotan |
| 6,078,913 A | 6/2000 | Aoki et al. |
| 6,085,241 A | 7/2000 | Otis |
| 6,092,194 A | 7/2000 | Touboul |
| 6,105,027 A | 8/2000 | Schneider et al. |
| 6,154,741 A | 11/2000 | Feldman |
| 6,173,364 B1 | 1/2001 | Zenchelsky et al. |
| 6,178,419 B1 | 1/2001 | Legh-Smith et al. |
| 6,178,505 B1 | 1/2001 | Schneider et al. |
| 6,182,118 B1 | 1/2001 | Finney et al. |
| 6,219,667 B1 | 4/2001 | Lu et al. |
| 6,233,618 B1 | 5/2001 | Shannon |
| 6,233,686 B1 | 5/2001 | Zenchelsky et al. |
| 6,253,188 B1 | 6/2001 | Witek et al. |
| 6,256,739 B1 | 7/2001 | Skopp et al. |
| 6,266,664 B1 | 7/2001 | Russell-Falla et al. |
| 6,295,559 B1 | 9/2001 | Emens et al. |
| 6,338,088 B1 | 1/2002 | Waters et al. |
| 6,357,010 B1 | 3/2002 | Viets et al. |
| 6,377,577 B1 | 4/2002 | Bechtolsheim et al. |
| 6,418,433 B1 | 7/2002 | Chakrabarti et al. |
| 6,446,119 B1 | 9/2002 | Olah et al. |
| 6,456,306 B1 | 9/2002 | Chin et al. |
| 6,460,141 B1 | 10/2002 | Olden |
| 6,466,940 B1 | 10/2002 | Mills |
| 6,486,892 B1 | 11/2002 | Stern |
| 6,505,201 B1 | 1/2003 | Haitsuka et al. |
| 6,519,571 B1 | 2/2003 | Guheen et al. |
| 6,567,800 B1 | 5/2003 | Barrera et al. |
| 6,571,249 B1 | 5/2003 | Garrecht et al. |
| 6,606,659 B1 | 8/2003 | Hegli et al. |
| 6,741,997 B1 | 5/2004 | Liu et al. |
| 6,742,003 B2 | 5/2004 | Heckerman et al. |
| 6,772,214 B1 | 8/2004 | McClain et al. |
| 6,785,732 B1 | 8/2004 | Bates et al. |
| 6,804,780 B1 | 10/2004 | Touboul |
| 6,807,558 B1 | 10/2004 | Hassett et al. |
| 6,832,230 B1 | 12/2004 | Zilliacus et al. |
| 6,832,256 B1 | 12/2004 | Toga |
| 6,839,680 B1 | 1/2005 | Liu et al. |
| 6,894,991 B2 | 5/2005 | Ayyagari et al. |
| 6,907,425 B1 | 6/2005 | Barrera et al. |
| 6,947,935 B1 | 9/2005 | Horvitz et al. |
| 6,947,985 B2 | 9/2005 | Hegli et al. |
| 6,978,292 B1 | 12/2005 | Murakami et al. |
| 6,981,281 B1 | 12/2005 | LaMacchia et al. |
| 6,988,209 B1 | 1/2006 | Balasubramaniam et al. |
| 7,058,822 B2 | 6/2006 | Edery et al. |
| 7,089,246 B1 | 8/2006 | O'laughlen |
| 7,093,293 B1 | 8/2006 | Smithson et al. |
| 7,096,493 B1 | 8/2006 | Liu |
| 7,185,015 B2 | 2/2007 | Kester et al. |
| 7,185,361 B1 | 2/2007 | Ashoff et al. |
| 7,197,713 B2 | 3/2007 | Stern |
| 7,209,893 B2 | 4/2007 | Nii |
| 7,213,069 B2 | 5/2007 | Anderson et al. |
| 7,313,823 B2 | 12/2007 | Gao |
| 7,359,372 B2 | 4/2008 | Pelletier et al. |
| 7,370,365 B2 | 5/2008 | Carroll et al. |
| 7,376,154 B2 | 5/2008 | Ilnicki et al. |
| 7,487,540 B2 | 2/2009 | Shipp |
| 7,603,685 B2 | 10/2009 | Knudson et al. |
| 7,603,687 B2 | 10/2009 | Pietraszak et al. |
| RE41,168 E | 3/2010 | Shannon |
| 7,690,013 B1 | 3/2010 | Eldering et al. |
| 2001/0032258 A1 | 10/2001 | Ishida et al. |
| 2001/0039582 A1 | 11/2001 | McKinnon et al. |
| 2001/0047343 A1 | 11/2001 | Dahan et al. |
| 2002/0042821 A1 | 4/2002 | Muret et al. |
| 2002/0049883 A1 | 4/2002 | Schneider et al. |
| 2002/0062359 A1 | 5/2002 | Klopp et al. |
| 2002/0073089 A1 | 6/2002 | Schwartz et al. |
| 2002/0078045 A1 * | 6/2002 | Dutta ............................... 707/7 |
| 2002/0091947 A1 | 7/2002 | Nakamura |
| 2002/0103848 A1 | 8/2002 | Giacomini et al. |
| 2002/0110084 A1 | 8/2002 | Butt et al. |
| 2002/0129039 A1 | 9/2002 | Majewski et al. |
| 2002/0129140 A1 | 9/2002 | Peled et al. |
| 2002/0129277 A1 | 9/2002 | Caccavale |
| 2002/0133509 A1 | 9/2002 | Johnston et al. |
| 2002/0144129 A1 | 10/2002 | Malivanchuk et al. |
| 2002/0152284 A1 | 10/2002 | Cambray et al. |
| 2002/0174358 A1 | 11/2002 | Wolff et al. |
| 2002/0178374 A1 | 11/2002 | Swimmer et al. |
| 2003/0005112 A1 | 1/2003 | Krautkremer |
| 2003/0009495 A1 | 1/2003 | Adjaoute |
| 2003/0023860 A1 | 1/2003 | Eatough et al. |
| 2003/0074567 A1 | 4/2003 | Charbonneau |
| 2003/0093694 A1 | 5/2003 | Medvinsky et al. |
| 2003/0097591 A1 * | 5/2003 | Pham et al. ..................... 713/201 |
| 2003/0097617 A1 | 5/2003 | Goeller et al. |
| 2003/0105863 A1 | 6/2003 | Hegli et al. |
| 2003/0110168 A1 | 6/2003 | Kester et al. |
| 2003/0126136 A1 | 7/2003 | Omoigui |
| 2003/0126139 A1 | 7/2003 | Lee et al. |
| 2003/0135611 A1 | 7/2003 | Kemp et al. |
| 2003/0167257 A1 | 9/2003 | De Bonet |
| 2003/0177187 A1 | 9/2003 | Levine et al. |
| 2003/0177394 A1 | 9/2003 | Dozortsev |
| 2003/0182420 A1 | 9/2003 | Jones et al. |
| 2003/0185399 A1 | 10/2003 | Ishiguro |
| 2004/0003139 A1 | 1/2004 | Cottrille et al. |
| 2004/0006621 A1 | 1/2004 | Bellinson et al. |
| 2004/0015586 A1 | 1/2004 | Hegli et al. |
| 2004/0019656 A1 | 1/2004 | Smith |
| 2004/0034794 A1 | 2/2004 | Mayer et al. |
| 2004/0049514 A1 | 3/2004 | Burkov |

| | | | |
|---|---|---|---|
| 2004/0062106 A1 | 4/2004 | Ramesh et al. | |
| 2004/0068479 A1 | 4/2004 | Wolfson et al. | |
| 2004/0078591 A1 | 4/2004 | Teixeira et al. | |
| 2004/0111499 A1 | 6/2004 | Dobrowski et al. | |
| 2004/0123157 A1 | 6/2004 | Alagna et al. | |
| 2004/0128285 A1 | 7/2004 | Green et al. | |
| 2004/0153644 A1 | 8/2004 | McCorkendale et al. | |
| 2004/0167931 A1 | 8/2004 | Han | |
| 2004/0181788 A1 | 9/2004 | Kester et al. | |
| 2004/0220924 A1 | 11/2004 | Wootton | |
| 2005/0015626 A1 | 1/2005 | Chasin | |
| 2005/0033967 A1 | 2/2005 | Morino et al. | |
| 2005/0066197 A1 | 3/2005 | Hirata et al. | |
| 2005/0091535 A1 | 4/2005 | Kavalam et al. | |
| 2005/0131868 A1 | 6/2005 | Lin et al. | |
| 2005/0132042 A1 | 6/2005 | Cryer | |
| 2005/0132184 A1 | 6/2005 | Palliyil et al. | |
| 2005/0155012 A1 | 7/2005 | Tayama et al. | |
| 2005/0210035 A1 | 9/2005 | Kester et al. | |
| 2005/0223001 A1 | 10/2005 | Kester et al. | |
| 2005/0251862 A1 | 11/2005 | Talvitie | |
| 2006/0004636 A1 | 1/2006 | Kester et al. | |
| 2006/0004717 A1 | 1/2006 | Ramarathnam et al. | |
| 2006/0026105 A1 | 2/2006 | Endoh | |
| 2006/0031504 A1 | 2/2006 | Hegli et al. | |
| 2006/0053488 A1 | 3/2006 | Sinclair et al. | |
| 2006/0068755 A1 | 3/2006 | Shraim et al. | |
| 2006/0075072 A1 | 4/2006 | Sinclair et al. | |
| 2006/0075494 A1 | 4/2006 | Bertman et al. | |
| 2006/0095404 A1 | 5/2006 | Adelman et al. | |
| 2006/0095459 A1 | 5/2006 | Adelman et al. | |
| 2006/0095586 A1 | 5/2006 | Adelman et al. | |
| 2006/0095965 A1 | 5/2006 | Phillips et al. | |
| 2006/0101514 A1 | 5/2006 | Milener et al. | |
| 2006/0129644 A1 | 6/2006 | Owen et al. | |
| 2006/0161986 A1 | 7/2006 | Singh et al. | |
| 2006/0265750 A1 | 11/2006 | Huddleston | |
| 2007/0005762 A1 | 1/2007 | Knox et al. | |
| 2007/0011739 A1* | 1/2007 | Zamir et al. | 726/22 |
| 2007/0028302 A1 | 2/2007 | Brennan et al. | |
| 2007/0124388 A1 | 5/2007 | Thomas | |
| 2007/0130327 A1* | 6/2007 | Kuo et al. | 709/224 |
| 2007/0156833 A1 | 7/2007 | Nikolov et al. | |
| 2007/0204223 A1* | 8/2007 | Bartels et al. | 715/540 |
| 2007/0260602 A1 | 11/2007 | Taylor | |
| 2008/0267144 A1 | 10/2008 | Jano et al. | |
| 2008/0295177 A1 | 11/2008 | Dettinger et al. | |
| 2010/0005165 A1 | 1/2010 | Sinclair et al. | |

FOREIGN PATENT DOCUMENTS

| | | |
|---|---|---|
| EP | 0 748 095 | 12/1996 |
| EP | 1 074 916 | 2/2001 |
| EP | 1 180 889 | 2/2002 |
| EP | 1 278 330 | 1/2003 |
| EP | 1 280 040 | 1/2003 |
| EP | 1 318 468 | 6/2003 |
| EP | 1 329 117 | 7/2003 |
| EP | 1 457 885 | 9/2004 |
| EP | 1 494 409 | 1/2005 |
| EP | 1 510 945 | 3/2005 |
| EP | 1 638 016 | 3/2006 |
| GB | 2418330 | 3/2006 |
| GB | 2418999 | 4/2006 |
| JP | 10 243018 | 9/1998 |
| JP | 2000-235540 | 8/2000 |
| JP | 2000 235540 A | 8/2000 |
| JP | 2002-358253 | 12/2002 |
| JP | 2003-050758 | 2/2003 |
| JP | 2004-013258 | 1/2004 |
| WO | WO 92/19054 | 10/1992 |
| WO | WO 96/05549 A1 | 2/1996 |
| WO | WO 96/42041 | 12/1996 |
| WO | WO 98/28690 | 7/1998 |
| WO | WO 01/31512 | 5/2001 |
| WO | WO 01/33371 | 5/2001 |
| WO | WO 01/55873 | 8/2001 |
| WO | WO 01/55905 | 8/2001 |
| WO | WO 01/63835 | 8/2001 |
| WO | WO 2005/010692 | 2/2005 |
| WO | WO 2005/017708 | 2/2005 |
| WO | WO 2005/022319 | 3/2005 |
| WO | WO 2005/074213 | 8/2005 |
| WO | WO 2006/027590 | 3/2006 |
| WO | WO 2006/062546 | 6/2006 |
| WO | WO 2006/136605 | 12/2006 |
| WO | WO 2007/059428 A | 5/2007 |

OTHER PUBLICATIONS

Dahan, M. Ed., "The Internet and government censorship: the case of the Israeli secret service" Online information. London, Dec. 12-14, 1989; Proceedings of the International Online Information Meeting, Oxford, Learned Information, GB, vol. Meeting 13, Dec. 5, 1995, pp. 41-48, XP000601363 sections 1, 3.

Ang, P. H. et al., "Censorship and the Internet: A Singapore Perspective" Communications of the Association for computing machinery, ACM, New York, NY, vol. 39, No. 6, Jun. 1, 1996, pp. 72-78, XP000641616 ISSN: 0001-0782, p. 74, col. 1.

Greenfield, P. et al., "Access Prevention Techniques for Internet Content Filtering" Internet Citation, XP002265027 URL:http://www.cmis.csiro.au/Reports/filtering.pdf, retrieved Dec. 15, 2003, the whole document.

Resnick, P. et al., "PICS: Internet Access Controls Without Censorship" Communications of the Association for Computing Machinery, ACM, New York, NY, vol. 39, No. 10, Oct. 1, 1996, pp. 87-93, XP000642207, ISSN: 0001-0782, the whole document.

C. L. Schuba and E. H. Spafford, Countering abuse of name-based authentication, Pub: In 22nd Annual Telecommunications Policy Research Conference, 1996, pp. 21.

Cohen, F., A Cryptographic Checksum for Integrity Protection, Computers & Security, Elsevier Science Publishers, Dec. 1, 1987, vol. 6, Issue 6, pp. 505-510, Amsterdam, NL.

European Search Report for Application No. 02258462.7, Jan. 30, 2006.

Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828&CFTOKEN=68827537> [retrieved on Dec. 7, 2007], Apr. 23, 2006-Apr. 27, 2006, pp. 1166-1171.

Gittler F., et al., The DCE Security Service, Pub: Hewlett-Packard Journal, Dec. 1995, pp. 41-48.

IBM Corp., Enforced Separation of Roles in a Multi-User Operating System, IBM Technical Disclosure Bulletin, Dec. 1991, Issue 34, pp. 120-122.

IBM Technical Disclosure Bulletin, Mean to Protect System from Virus, IBM Corp., Aug. 1, 1994, Issue 659-660.

Igakura, Tomohiro et al., Specific quality measurement and control of the service-oriented networking application., Technical Report of IEICE, IEICE Association, Jan. 18, 2002, vol. 101, Issue 563, pp. 51-56, Japan.

International Search Report and Written Opinion dated Jun. 30, 2008 for PCT Patent Application No. PCT/US2007/024557.

International Search Report and Written Opinion for PCT Application No. PCT/US2007/015730 dated Dec. 27, 2008, 16 pages.

International Search Report, International Application No. PCT/US2006/049149, Mailed Mar. 10, 2008, 4 pages.

Microsoft Press Computer Dictionary, 3rd edition, Pub: Microsoft Press, 1997, pp. 262, 276.

Molitor, Andrew, An Architecture for Advanced Packet Filtering, Proceedings for the Fifth Usenix Unix Security Symposium, Jun. 1995, pp. 1-11.

Newman, H., A Look at Some Popular Filtering Systems, Pub: Internet, Online!, Jul. 25, 1999, pp. 1-11.

PCT International Search Report and Written Opinion for corresponding International Application No. PCT/GB2005/002961, Oct. 19, 2005.

Reid, Open Systems Security: Traps and Pitfalls, Computer & Security, 1995, Issue 14, pp. 496-517.

Roberts-Witt, S., The 1999 Utility Guide: Corporate Filtering, Pub: PC Magazine Online, Apr. 5, 1999, pp. 1-11.

Sandhu, et al., Access Control: Principles and Practice, IEEE Communications Magazine, Sep. 1994, pp. 40-48.

Secure Computing Corporation, SmartFilter™ Web Tool, Dec. 1, 1998, pp. 1-2.

Sequel Technology, Inc., Sequel and Surfwatch Partner to Provide Innovative Internet Resource Management Tools for Large Enterprises, Pub: Internet, Online!, Feb. 25, 1999, pp. 1-3.

Snyder, J., A Flurry of Firewalls, www.opus1.corn/www/jms/nw-firewall.html, Network World, Jan. 29, 1996, pp. 1-8.

Stein, Web Security—a step by step reference guide, Addison-Wesley, 1997, pp. 387-415.

Supplementary European Search Report for EPO App. No. 00 90 7078, May 18, 2004.

SurfControl PLC, SuperScout Web Filter Reviewer's Guide, 2002, pp. 36.

Surfcontrol, Project Nomad, http:www.surfcontrol.com/news/newsitem.aspx?id=593, Oct. 29, 2003.

SurfWatch Software, SurfWatch® Professional Edition: Product Overview, Pub: Internet, Online!, May 26, 1999, pp. 1.

Symantec Corporation, E-security begins with sound security policies, Announcement Symantec, XP002265695, Jun. 14, 2001, pp. 1,9.

Williams, R., Data Integrity with Veracity, Retrieved from the Internet: <URL:ftp://ftp.rocksoft.corn/clients/rocksoft/papers/vercty10.ps>, Sep. 12, 1994.

Wobus, J., DHCP FAQ, www.nd.edu/~milind/FAQs/FAQ_dhcp, Dec. 29, 1995, pp. 1-10.

Yialelis, et al., Role-Based Security for Distributed Object Systems, Proceedings of the IEEE Fifty Workshops on Enabling Technology: Infrastructure for Collaborative Enterprises, WET ICE '96, Jun. 19, 1996-Jun. 21, 1996, pp. 6.

Adam Lyon, "Free Spam Filitering Tactics Using Eudora," May 21, 2004, pp. 1-4.

Office Action in U.S. App. No. 11/680,494, filed Mar. 18, 2009.

"Bloom Filter" on Wikipedia, http://en.wikipedia.org/wiki/Bloom_filter, retrieved on Jul. 31, 2009.

"Google + StopBadware.org = Internet Gestapo?", http://misterpoll.wordpress.com/2007/01/05/google-stopbadwareorg-internet-gestapo/, Jan. 5, 2007.

"Trends in Badware 2007", StopBadware.org.

George, Erica, "Google launches new anti-badware API", http://blog.stopbadware.org//2007/06/19/google-launches-new-anti-badware-api, Jun. 19, 2007.

Greenfield, P., et al., Access Prevention Techniques for Internet Content Filtering, CSIRO (XP002265027), Dec. 1999.

Hubbard, Dan, Websense Security Labs, The Web Vector: Exploiting Human and Browser Vulnerabilities, Toorcon 2005 (http://www.toorcon.org).

Wang et al., MBF: a Real Matrix Bloom Filter Representation Method on Dynamic Set, 2007 IFIP International Conference on Network and Parallel Computing—Workshops, Sep. 18, 2007, pp. 733-736, Piscataway, NJ, USA.

* cited by examiner

Logging Database

| No. Requests | URL | JavaScript? | ActiveX? |
|---|---|---|---|
| 9000 | www.gougle.com | Yes | Yes |
| 32 | www.amazon.com/specialoftheday | No | Yes |
| 2 | www.sportsweb.com | Yes | No |
| 1 | www.aasdfghd.com | No | No |

FIG. 4

URL Access Policy Database

| User | Category | Always block? | Allowed Times |
|---|---|---|---|
| asmith | Malicious | Yes | |
| bnguyen | Gambling | | 6pm – 8 am |
| clee | Spyware | Yes | |
| | Politics | | 6pm – 8 am |

FIG. 5

*Categorized URLs* — 146

| URL | Category |
|---|---|
| http://example1.com/abc | Malicious |
| http://example2.biz/abc | Gambling |
| http://example4.com/abc | Spyware |

*Uncategorized URLs* — 147

| URL |
|---|
| http://example5.com/abc |
| http://example6.biz/abc |
| http://example3.com/abc |

*FIG. 6B*

| ITEM TYPE | URL | ACTION TAKEN | CATEGORY | CODE |
|---|---|---|---|---|
| a,href | http://www.coolscreensavers.com/ | Allow | Search Engines | 76 |
| a,href | http://www.verycoolscreensavers.com/ | Allow | Search Engines | 76 |
| a,href | http://www.verycoolscreensaver.com/ | Observe | Free Software | 99 |
| a,href | http://www.somewhatcoolscreensavers.com/ | Allow | Search Engines | 76 |
| a,href | http://www.downloadacoolscreensaver.com/ | Observe | Free Software | 99 |
| img,src | http://www.adultcoolscreensavers.com/sample.gif | Block | Adult Content | 66 |
| a,href | http://www.thebestscreensavers.com/ | Allow | Search Engines | 76 |
| a,href | http://www.artisticscreensavers.com/ | Allow | Search Engines | 76 |
| img,src | http://www.verycoolscreensavers.com/save.jpg | Allow | Search Engines | 76 |
| a,href | http://www.trickyscreensavers.com/ | Block | Spyware | 154 |
| a,href | http://www.basicscreensavers.com/ | Observe | Free Software | 99 |

*FIG. 11B*

SYSTEM AND METHOD OF CONTROLLING ACCESS TO THE INTERNET

BACKGROUND OF THE INVENTION

1. Field of the Invention

This application relates to controlling access to the Internet by monitoring data received in response to a data request to the Internet. More particularly, the application relates to systems and methods for monitoring results to user requests for content or information.

2. Description of the Related Art

It is estimated that 80 percent of website visits are initiated through search engines. As a result, website pages that appear in a list of returned search results or hyperlinks tend to receive significant inbound traffic through the search engine. The higher a website is on the list of returned hyperlinks, the more likely the user will select that hyperlink. Unfortunately, techniques such as "Google-bombing" or "Spamdexing" allow website operators to deliberately modify HTML pages associated with their websites so as to increase the chance that their pages are placed higher on the list of search engine results, or to influence the category to which their pages are assigned in a misleading or dishonest manner. Thus, operators of websites having undesirable or malicious content often employ such tactics to generate traffic to their websites.

In addition, as the use of the Internet evolves, more and more content is delivered to users from disparate and sometimes unknown sources. For example, the desire on the part of users for quicker and easier access to frequently updated content has led to the development of technologies such as web feeds which serve frequently updated content. In one common scenario of using web feeds, a content provider publishes a web feed link on their site which allows an aggregator program (also called a feed reader or a news reader) to register to receive updated content. The aggregator is configured to periodically ask each server in its feed list if they have new content. For each of the servers having new content, the aggregator either makes a note of the new content or downloads the content. Although various types of content may be delivered by web feeds, typically, HTML pages or URL links to web pages are delivered. As with the search engine results discussed above, operators of websites having undesirable or malicious content may utilize misleading techniques with the purpose of having their malicious content included in the web feeds.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In one embodiment, a method of monitoring data sent from a requested device to a requesting device is provided. The method includes identifying an outgoing request from the requesting device and intercepting content sent from the requested device in response to the outgoing request. At least a portion of the intercepted content is compared to a database. The method further includes modifying the content by removing at least some of the content based at least in part on a classification and presence of the content in the database and sending the modified content to the requesting device.

In another embodiment a system for monitoring content sent from a first device to a second device in response to a request by the second device for data from the first device is provided. The system includes a gateway server module configured to intercept the content sent from the first device to the second device and determine a category for the content based at least partially on a comparison of the intercepted content with data in a categorized URL/content database. The system further includes a policy module including instructions for modifying content based on the category of the content, and a content filtering module configured to modify at least some of the content based at least in part on the instructions.

In yet another embodiment, a method of controlling access to data requested from the Internet for display at a workstation is provided. The method includes sending a network request for information and receiving a plurality of URLs in response to the network request at a gateway server module. The method further includes comparing the plurality of URLs to a database of categorized URLs and modifying at least one of the plurality of URLs based at least in part on the comparison. The modified plurality of URLs are forwarded to the workstation.

In still another embodiment, a system for monitoring data sent from a requested device to a requesting device is provided. The system includes means for identifying an outgoing request from the requesting device to the requested device. The system further includes means for intercepting content sent from the requested device in response to the outgoing request and means for comparing at least a portion of the content to data in a database. The system further includes means for modifying the content by removing at least some of the content based at least in part on a classification and presence of the content in the database; and means for sending the modified content to the requesting device.

BRIEF DESCRIPTION OF THE DRAWINGS

In this description, reference is made to the drawings wherein like parts are designated with like numerals throughout.

FIG. 4 is an exemplary table of a logging database from FIG. 3.

FIG. 5 is an exemplary table of a URL Access Policy from FIG. 3.

FIG. 6A is an exemplary table of URLs and their associated categories.

FIG. 6B is an exemplary table of uncategorized URLs.

FIG. 11B is a listing of the URLs summarized in FIG. 11A along with results of an analysis performed on the listed URLs by the system of FIG. 1.

DETAILED DESCRIPTION OF CERTAIN INVENTIVE EMBODIMENTS

Certain embodiments provide for systems and methods of monitoring data sent from a requested device to a requesting device, and removing or identifying certain portions of the returned data that may be malicious or otherwise contain objectionable content such as, for example, potentially executable web content. The systems and methods may further remove uniform resource locator (URL) links from the returned data which link to web pages having malicious or otherwise objectionable content.

As used herein URL refers to a network or Internet address. A URL may consist of an access protocol (e.g., http), a domain name (e.g., www.google.com), and in some cases a path to a file or resource residing on the server indicated by the domain name. A URL link is a portion of a web page or some other network resource that may be used to access a URL. A example of a URL link is an HREF tag in HTML. As used herein, objectionable content may include any data which an organization wishes to prevent users from accessing over a network. An organization may refer to any entity that manages a local computer network having users who access the Internet. Potentially executable web content generally refers to any type of content that includes instructions that are executed by a web browser or web client computer. Potentially executable web content may include, for example, applets, executable code embedded in HTML or other hypertext documents (including script languages such as JavaScript or VBScript), executable code embedded in other documents, such as Microsoft Word macros, or stylesheets. Potentially executable web content may also refer to documents that execute code in another location such as another web page, another computer, or on the web browser computer itself. For example, a HTML web page that includes an "OBJECT" element, and thus can cause execution of ActiveX or other executable components, may generally be considered potentially executable web content regardless of the location of the executable components.

Malicious content may refer to content that is not executable but which is calculated to exploit a vulnerability on a client computer. However, potentially executable web content may also be malicious content. For example, image files have been used to exploit vulnerabilities in certain operating systems when those images are processed for display. Moreover, malicious web content may also refer to interactive content such as "phishing" schemes in which a HTML form or other web content is designed to appear to be provided by another, typically trusted, web site such as a bank, in order to deceive the user into providing credentials or other sensitive information to an unauthorized party.

Figure 1:
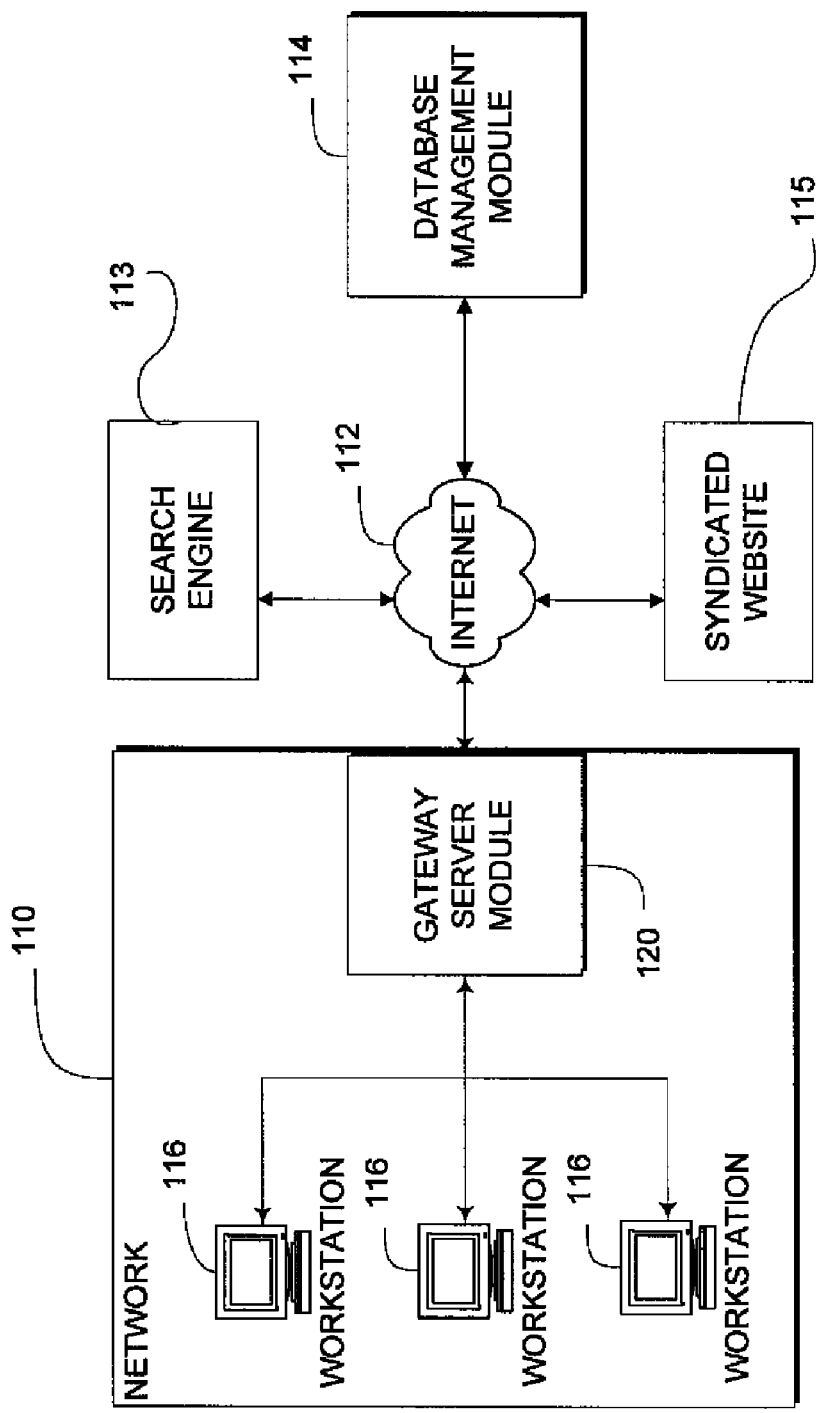
FIG. 1 is a block diagram of various components of a system in accordance with aspects of the invention.

FIG. 1 provides a top level illustration of an exemplary system according to a preferred embodiment of the present invention. The system includes a network 110. The network 110 may be a local area network, a wide area network, or some other type of network. The network 110 may include one or more workstations 116. The workstations 116 may be various types of client computers that are attached to the network. The workstations 116 may be desktop computers, notebook computers, handheld computers or the like. The workstations 116 may also be loaded with operating systems that allow them to utilize the network through various software modules such as web browsers, e-mail programs, or the like.

Each of the workstations 116 may be in electrical communication with a gateway server module 120. The gateway server module may reside at the edge of the network 110 so that traffic sent to and from the Internet 112 may pass through it on its way into or out of the network 110. The gateway server module 120 may take the form of a software module that is installed on a server that stands as a gateway to a wider area network 112 than the network 110 to which the workstations 116 are directly attached. Also connected to the Internet 112 is a database management module 114. The database management module 114 also may be a software module (or one or more hardware appliances) which resides on one or more computing devices. The database management module 114 may reside on a machine that includes some sort of network connecting hardware, such as a network interface card, which allows the database management module 114 to send and receive data and information to and from the Internet 112.

One or more search engines 113 are connected to the Internet 112. The search engine 113 is typically a web site which receives user requests for information and websites which are relevant to the parameters of the submitted user requests. Well known examples of search engines are Google, Yahoo, and Ask.com.

One or more syndicated websites 115 are connected to the Internet 112. The syndicated website 115 offers a web feed of content from the website. Typically, the content from the syndicated website 115 is accessed by web feed readers installed on client workstations 116.

Figure 2:
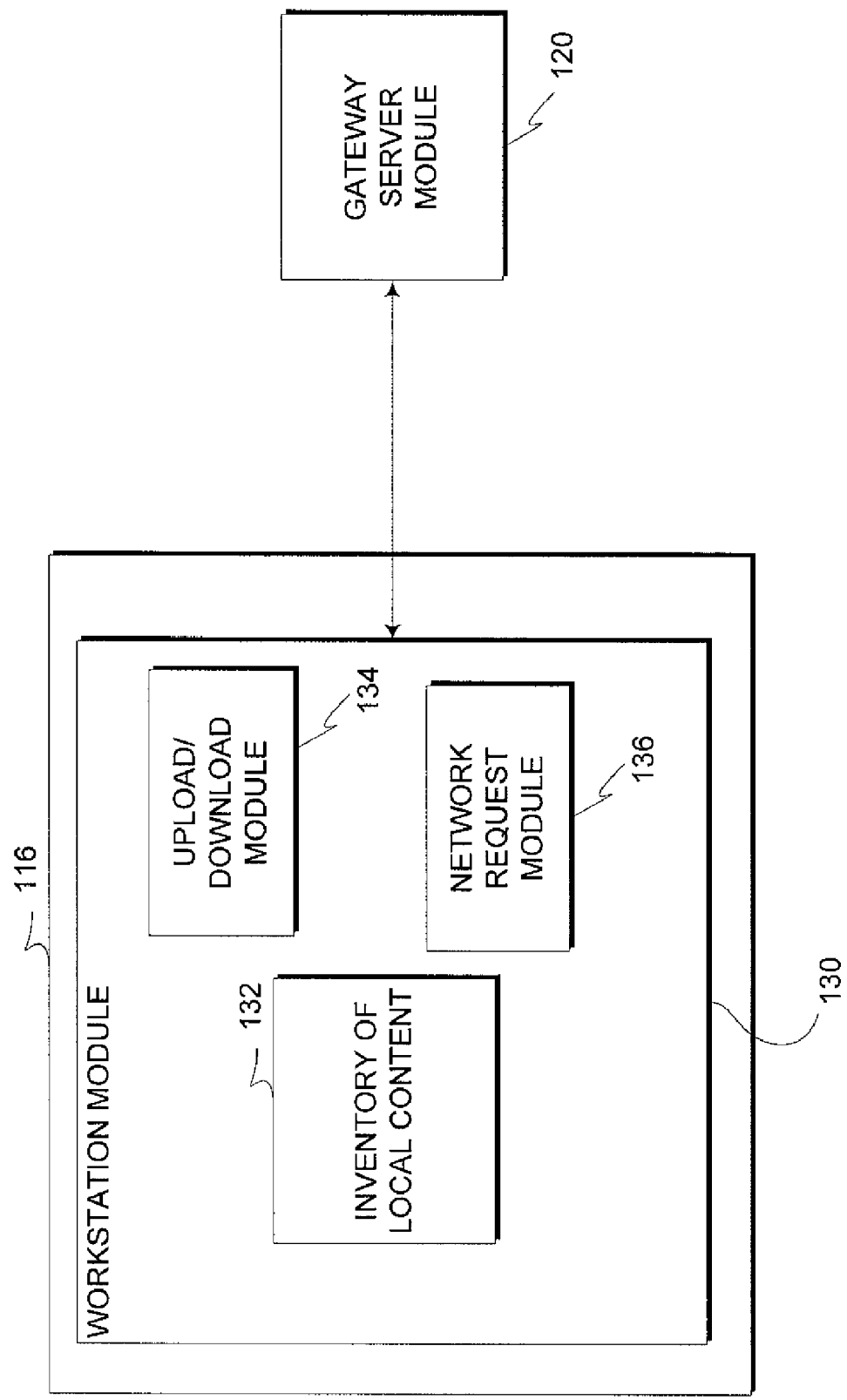
FIG. 2 is a block diagram of a workstation module from FIG. 1.

Referring now to FIG. 2, a more detailed view of the workstation 116 is presented. The workstation 116 may include a workstation module 130. The workstation module 130 may take the form of software installed to run on the operating system of the workstation 116. Alternatively, the workstation module 130 could be an application running on another machine that is launched remotely by the workstation 116.

Figure 3:
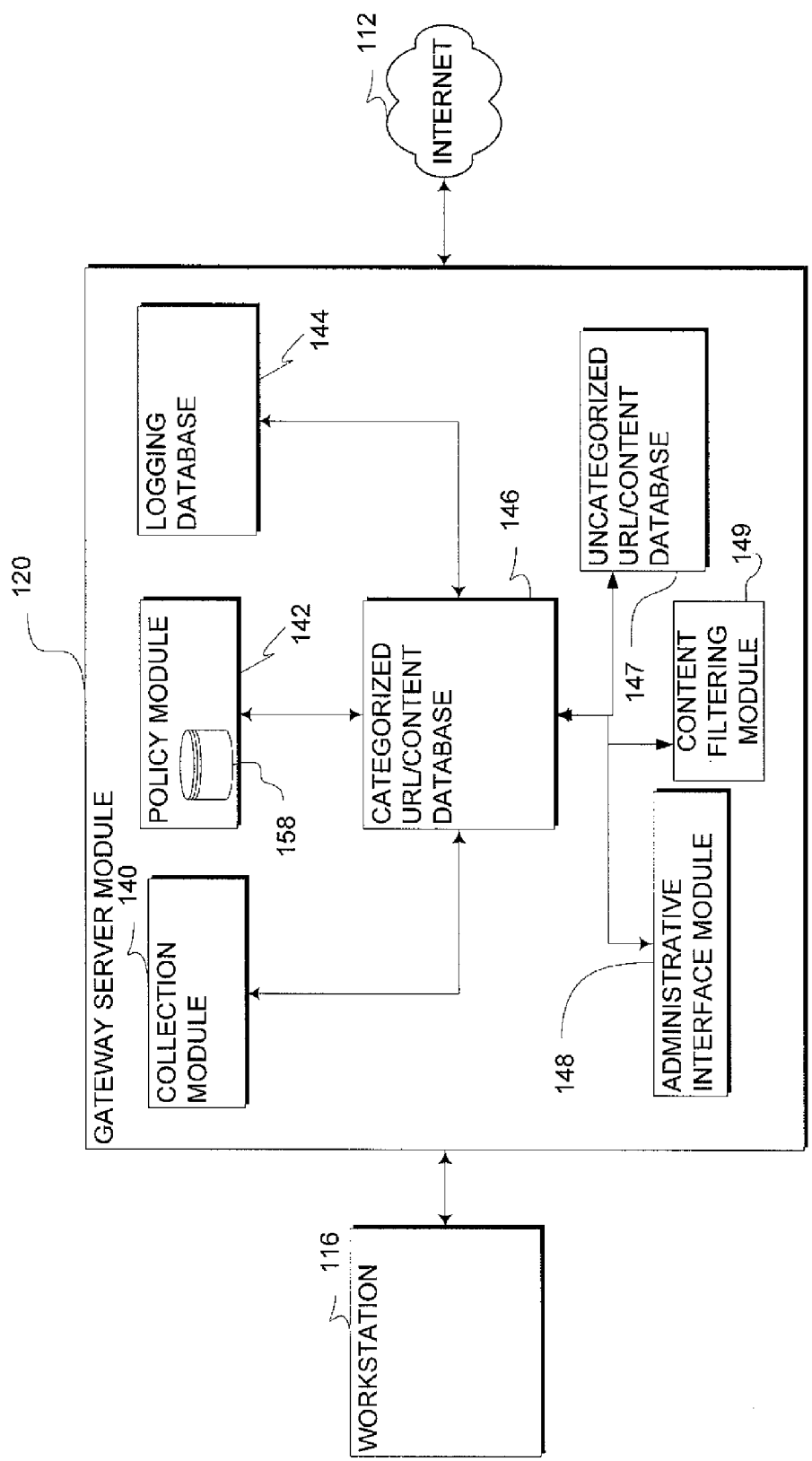
FIG. 3 is a block diagram of a gateway server module from FIG. 1.

The workstation module 130 may include various components. The workstation module may include a local content inventory module 132 which may store some or all of the network content received by the workstation 116. In some embodiments, the local content inventory module 132 may periodically inventory all content received from the network 110 and the Internet 112. The inventoried data may be uploaded to the gateway server module 120 for comparison to data stored in the categorized URL/content database 146 (FIG. 3). The local content inventory module 132 may also be configured to determine whether new content is being introduced to the workstation 116 by comparison to the inventoried local content 132.

The workstation module 130 also may include one or more upload/download modules 134 and one or more network request modules 136. The upload/download modules 134 may be used to send and receive data from the network 110, through the gateway server module 120 and to the Internet 112. The network request module 136 may receive a data request from either a user or some system process, and send the request via the gateway server module 120 to retrieve the file and/or content associated with the request. The request may be a search engine request made to the search engine 113. In response to the search, the search engine 113 may return one website or a list of websites (and URL links leading to those websites) based on the search parameters. The request may also be a content request made to the syndicated website 115. In response to the request, the syndicated website 115 may return one URL link or a list of URL links to the requested content. For ease of explanation, the term network request is used to include user requests for content via the search engine 113 or requests sent via a web feed reader to the syndicated website 115. The system of FIG. 1 monitors and/or modifies the data returned in response to the network request to inhibit objectionable or malicious content from being available to the user.

Typically, the functions of each of the upload/download modules 134 and the network request modules 136 may be performed by software applications such as web browsers, with Internet Explorer®, Mozilla Firefox, Opera, Safari, being examples of browsing software well-known in the art. These functions may also be performed by other types of software such as web feed readers, instant messaging programs, peer-to-peer file sharing applications, digital media player application (e.g., iTunes®, RealPlayer, Quicktime), or some other applications.

Alternatively, the functions of the modules may be divided among different software applications. For example, an FTP application may perform the functions of the upload/download module 134, while a web browser performs the functions of sending requests to the search engine. A web feed reader application may send a request for content to the syndicated website 1115. Other types of software may also perform the functions of the upload/download module 134. Although these types of software are generally not desirable on a workstation, software such as Spyware, or Trojan Horses may make requests to send and receive data from the Internet.

The workstation module 130 may be in communication with the gateway server module 120. The gateway server module 120 may be used to analyze incoming and outgoing web traffic and to make various determinations about the impact the traffic may have on the workstations 116. Referring now to FIG. 3, an example of the gateway server module 120 is provided. The gateway server module 120 is in two way communication with the workstation 116. It may receive file uploads and downloads and network requests from the workstation module 130. The gateway server module 120 is also in two way communication with the Internet 112. Thus, requests originating within the workstations 116 of the network 110 may be required to pass through the gateway server module 120 as they proceed to the Internet. In some embodiments, the gateway server module 120 may be integrated with some firewall hardware or software that protects the network 110 from unauthorized intrusions from the Internet 112. In other embodiments, the gateway server module 120 may be a standalone hardware appliance or even a software module installed on a separate gateway server residing at the network gateway to the Internet 112.

As discussed above, the gateway server module 120 may receive network requests and upload/download data from the workstation 116 by way of the workstation module 130. The gateway server module 120 may include various components that perform various functions based on the data received.

One feature included in the gateway server module 120 is a categorized URL database 146. The URL database 146 may be used to store information about URLs including data that is associated with the URLs. The categorized URL database 146 may be a relational database, or it may be stored in some other form such as a flat file, an object-oriented database, and may be accessed via an application programming interface (API), or some database management software (DBMS). The URL database 146 may generally be used to help determine whether data returned in response to a network request will be permitted to be completed. In one embodiment, the URLs stored in the URL database 146 are categorized.

The gateway server module 120 may also include a policy module 142. The policy module 142 may be used to implement network policies regarding how certain content will be handled by the gateway server module 120 or by a firewall or some other security software installed within the network 110. In one embodiment, the policy module 142 may be configured to provide the system guidance on how to handle a returned list of URLs in response to a network request where at least some of the returned URLs are categorized. For example, the gateway server module 120 may be configured to edit or identify returned URLs that are categorized as being "Malicious" or "Spyware." In other embodiments, the policy module 142 may be used to determine how to handle returned URLs that have not been categorized. In one embodiment, the system may be configured to block all returned URLs that are not in the categorized URL database 146. The policy module 142 may also be configured to allow certain uncategorized URLs based on the user making the request or the time at which the request is made. This allows the system to avoid having a one-size-fits-all configuration when such as configuration would not meet the business needs of the organization running the gateway server module 120.

The gateway server module 120 may also include a content filtering module 149. The content filtering module 149 may work in conjunction with the policy module and the categorized URL/content database 146 to filter portions of search results returned in response to a network request. In one embodiment, the content filtering module 149 may be configured to remove URL links and other content from a list of URLs returned in response to a user query sent to an Internet search engine 113. By way of example and not of limitation, the content filtering module 149 may be configured to recognize an outgoing search engine query. A page returned by the search engine 113 to the client workstation 116 may be intercepted by the gateway server module 120 and analyzed by the content filtering module 149. The content filtering module 149 may be configured to parse the returned page and identify URL links in the returned search results and embedded items of content such as images or active content.

Each identified URL link or item of content may be compared to the data in the URL/content database 146 to determine if the URL link has already been categorized. If it has been categorized, the policy module is consulted for instructions on how to handle the content. For example, the policy module 142 may instruct the content filtering module 149 to remove URL links that lead to web pages that are categorized as being "Malicious" or "Spyware." In addition, the content filtering module 149 may also be configured to remove objectionable content from the returned search engine results based on the presence and categorization of the content in the URL/content database 146. Further details of this process will be provided below in connection with FIGS. 10-17.

The gateway server module 120 may include a collection module 140. The collection module 140 may be a software program, routine, or process that is used to collect data about URLs. In one embodiment, when an internet request is received from the network request module 136 for content from the syndicated website 115, the collection module 140 may be configured to visit the website associated with the syndicated website 115 and download data to the gateway server module 120 for analysis by components of the gateway server module 120. The downloaded data may also be sent via the Internet 112 for delivery to the database management module 114 (as will be discussed in further detail below).

In some embodiments, the gateway server module 120 may also include a logging database 144. The logging database 144 may perform various functions. For example, it may store records of certain types of occurrences within the network 110. In one embodiment, the logging database 144 may be configured to record each event in which an uncategorized URL is requested by a workstation 116. In some embodiments, the logging database 144 may also be configured to record events in which search engine results include URL links to uncategorized URL, In some embodiments, the logging database 144 may also be configured to record the frequency with which a particular uncategorized URL is returned in response to network requests. This information may be useful in determining whether an uncategorized URL should be of particular importance or priority and should be categorized by the database management module 114 ahead of earlier received data. In some embodiments, uncategorized URLs may be stored separately in an uncategorized URL database 147.

For example, some spyware may be written to request data from a particular URL. If many workstations 116 within the network 110 are infected with the spyware, repeated requests to a particular URL may provide an indication that some anomaly is present within the network, Alternatively, if a particular URL link is continuously returned with search results requested from the search engine 113, it may provide an indication that the search engine has been compromised in some way, and that the returned results may include harmful data. The logging database may also be configured to record requests of categorized URL data. In some embodiments, categorizing requests of categorized URLs may be helpful in determining whether a particular URL has been mischaracterized.

Referring now to FIG. 4, an example of the logging database 144 is discussed. The logging database 144 includes four columns of data. The first column "No. Requests" 152 is indicative of the number of times a particular URL has been returned in response to a network request within the network 110. The second column "URL" 154 records the particular URL string that is being logged in the logging database 144. Thus, when a URL is sent to the logging database 144, the database may first be searched to determine whether the URL string is already in it. If not, then the URL string may be added to the database. In some embodiments, the collection module 140 may be configured to visit the requested URL and gather data about the URL. The collection module 140 may retrieve the page source of the requested URL and scan it for certain keywords that may indicate a type of content. For example, if the page source includes "javascript://" then the page may be identified as having JavaScript. While such content is not inherently dangerous, a web page with JavaScript may have a greater chance of including malicious content designed to exploit how a browser application handles JavaScript function calls. In some embodiments, this data may be stored in the logging database 144 in JavaScript column 155. The logging database may also receive similar information from pages that include Active-X content and store that content within Active X column 156. In other embodiments, other types of content may be detected and stored for java applets, VB Script, and the like.

Referring again to FIG. 3, the gateway server module 120 may further include an administrative interface module 148 or "admin module." The admin module 148 may be used to allow network administrators or other technical personnel within an organization to configure various features of the gateway server module 120. In certain embodiments, the admin module 148 allows the network administrator or some other network management-type to configure the policy module 142.

Referring now to FIG. 5, an example of a URL access policy database 158 is provided. The URL access policy database 158 may be used by the policy module 142 to implement policies for accessing web-based content by workstations 116 within the network 110. In the embodiment shown the URL access policy database 158 includes a table with four columns. The first column is a user column 160. The "User" column 160 includes data about the users that are subject to the policy defined in a given row of the table. The next column, "Category" 162, lists the category of content to which the policy defined by that row is applicable. The third column, "Always Block" 164, represents the behavior or policy that is implemented by the system when the user and category 166 of requested content match the user and category as defined in that particular row. In one embodiment, the "Always Block" field may be a Boolean-type field in which the data may be set to either true or false. Thus, in the first row shown in the data table, the policy module 142 is configured to "always block" requests for "malicious content" by user "asmith."

As noted above, the policy module may also be configured to implement policies based on different times. In the embodiment provided in FIG. 5, the fourth column "Allowed Times" 166 provides this functionality. The second row of data provides an example of how time policies are implemented. The user 160 is set to "bnguyen" and the category 162 is "gambling." The policy is not configured to "always block" gambling content for "bnguyen," as indicated by the field being left blank. However, the time during which these network requests are permitted is limited to 6 PM to 8 AM. Thus, adopting these types of policies allows network administrators to provide a certain degree of flexibility to workstations and users, but to do so in a way that network traffic is not compromised during typical working hours.

FIG. 6A is an exemplary table of URLs and their associated categories. FIG. 6B is an exemplary table of uncategorized URLs. In one embodiment, the categorized URLs may be stored in a two-column database table 146 such as the one shown in FIG. 6A. In one embodiment, the table may include a URL column 172 which may store the URL string that has been characterized. The Category column 174 may store data about how that URL has been characterized by database module 114 (as will be described in detail below). In one embodiment, the URL field may be indexed so that it may be more quickly searched in real time. Because the list of categorized URLs may reach well into the millions of URLs, a fast access routine is beneficial.

Referring now to FIG. 6B, the table of uncategorized URLs 147 is provided (described earlier in connection with FIG. 3). This table may be populated by network requests from the workstation 116 which request a URL or a list of URLs that are not present in the categorized URL table 146. For example, the websites identified by a web feed reader as having content requested by the user and that are not categorized may be added to the table of uncategorized URLs 147. In addition, the table may also include uncategorized URLs which were listed in pages returned by search engine 113 in response to search engine requests. As will be described in greater detail below, the gateway server module 120 may be configured to query the categorized URL database 146 to determine whether a URL listed in the page returned by the search engine 113 should be blocked or removed from the page content. If the URL is in the categorized database 146 the policy module may determine whether to remove the URL listing from the returned webpage. If the listed URL is not found in the categorized URL database, however, it may be added to the list of uncategorized URLs 176 so that it may be sent to the database management module 114 via the Internet 112 and later analyzed and categorized and downloaded into the database of categorized URLs 146.

Figure 7:
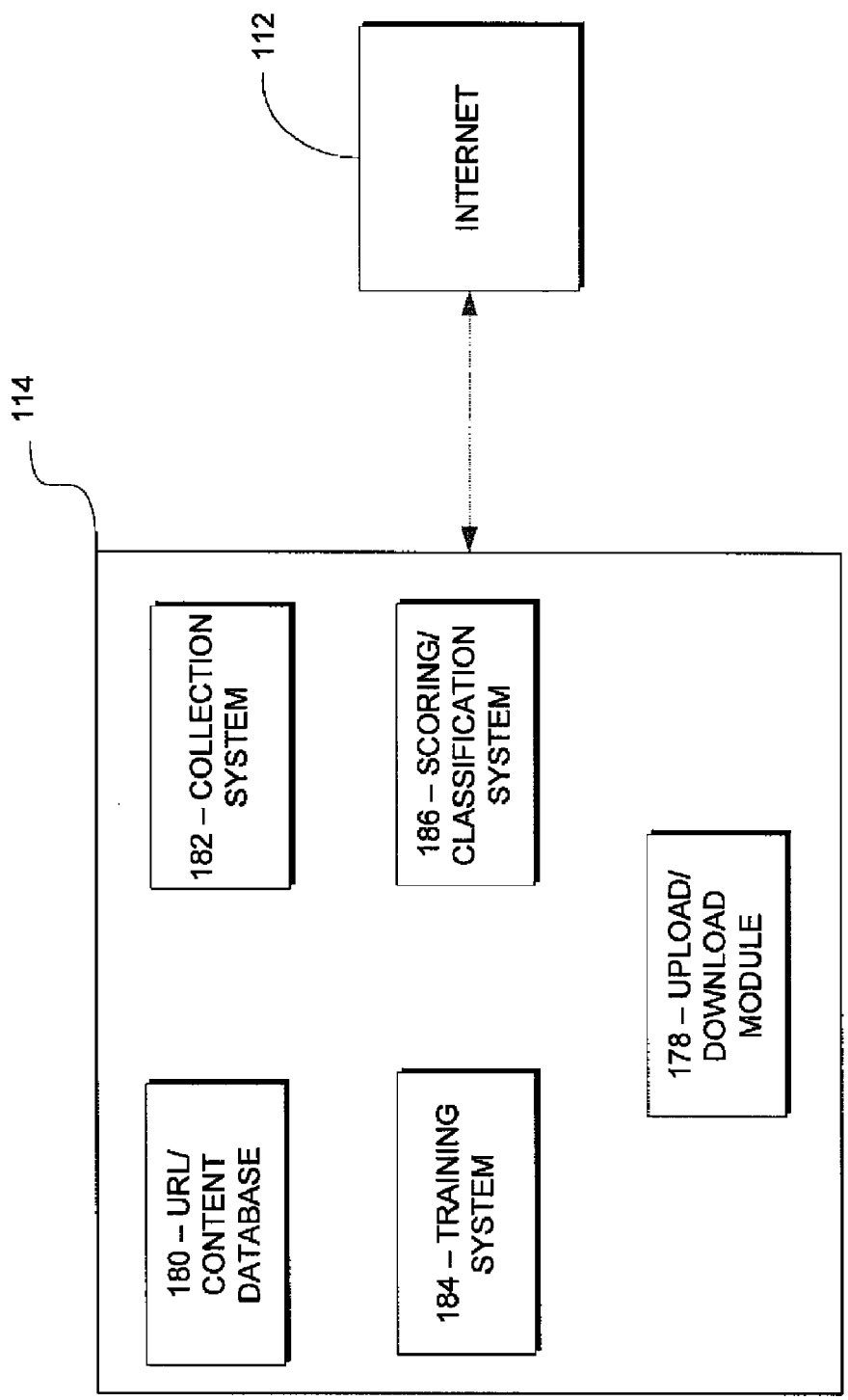
FIG. 7 is a block diagram of a database management module from FIG. 1.

FIG. 7 is an illustration of various components that may be included in the database management module 114. As discussed above, the database management module 114 may be located remotely (accessible via Internet 112) from the network 110 and its associated workstations 116. The database management module may take the form of one or many different hardware and software components such as a server bank that runs hundreds of servers simultaneously to achieve improved performance.

In one embodiment, the database management module 114 may include an upload/download module 178. The upload/download module 178 may be a software or hardware component that allows the database management module 114 to send and receive data from the Internet 112 to any number of locations and may or may not operate in a substantially similar manner as the upload/download module 134 on the gateway server module 120. In one embodiment, the upload/download module is configured to send newly categorized URLs to gateway server modules 120 on the Internet 112 for addition to their local URL databases 146.

The database management module 114 may also include a database management module URL/content database 180. The database management module URL/content database 180 may take the form of a data warehouse which stores URL strings and information about URLs that have been collected by a collection system 182 which will be described in further detail below. The database management module URL/content database 180 may be a relational database that is indexed to provide quick and effective searches for data. In certain embodiments, the URL/content database 180 may be a data warehousing application which spans numerous physical hardware components and storage media. The URL/content database 180 may include data such as URL strings, the content associated with those strings, information about how the content was gathered (e.g., by a honey client, by a customer submission, etc.), and possibly the date in which the URL was written into the URL/content database 180.

The database management module 114 may further include a training system 184. The training system 184 may be a software/hardware module which is used to define properties and definitions that may be used to categorize web-based content. The database management module 114 may further provide a scoring/classification system 186 which utilizes the definitions and properties created by the training system 184 to provide a score or classification (e.g., a categorization) to web content so that the categorization may be delivered via the upload/download module 178 to gateway server modules 120.

Figure 8:
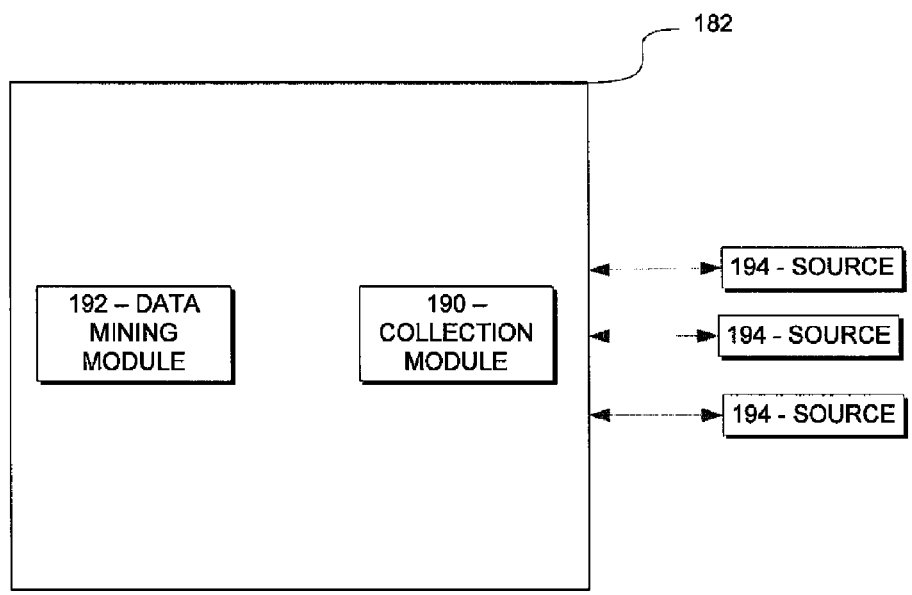
FIG. 8 is a block diagram of a collection system from FIG. 7.

With reference now to FIG. 8, a more detailed view of the collection system 182 is provided. The collection system 182 may include a database management collection module 190 which is coupled (either directly or indirectly) to a data mining module 192. The database management collection module 190 may be used by the database management module 114 to collect data for the URL/content database 180 about URLs that have not been categorized. The database management collection module 190 may also be used to collect URLs for additional analysis by other system components. The database management collection module 190 may be associated with one or more collection sources 194 from which it may collect data about URLs. Collection sources 194 may take various forms. In some embodiments, the collection sources 194 may include active and passive honeypots and honey clients, data analysis of logging databases 144 stored on the gateway server module 120 to identify applications, URLs and protocols for collection. The collection sources 194 may also be webcrawling applications that search the Internet 112 for particular keywords or search phrases within page content. The collection sources 194 may also include URLs and IP addresses data mined from a DNS database to identify domains that are associated with known malicious IP addresses. In some embodiments, URLs for categorization may be collected by receiving malicious code and malicious URL samples from other organizations who share this information. In yet other embodiments, URLs may be collected via e-mail modules configured to receive tips from the public at large, much in the way that criminals are identified through criminal tip hotlines.

Figure 9:
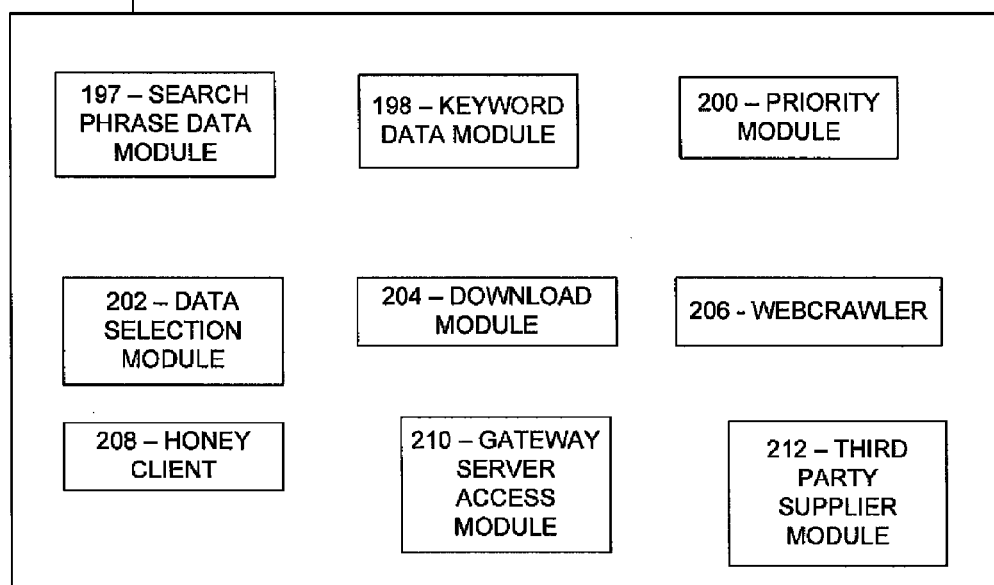
FIG. 9 is a block diagram of a collection module from FIG. 8.

Referring now to FIG. 9, a more detailed view of the database management collection module 190 is provided. The database management collection module 190 may include various subcomponents that allow it to effectively utilize each of the collection sources 194 described above. The database management collection module 190 may include a search phrase data module 197 and an expression data module 198. The search phrase data module 197 collects and provides search phrases that may be relevant to identifying inappropriate content. The expression data module 198 may include various types of expressions such as regular expressions, operands, or some other expression. The search phrase data module 197 and the expression data module 198 each may include updatable record sets that may be used to define the search parameters for the web crawling collection source 194. The database management collection module 190 may also include a priority module 200. The priority module 200 may take the form of a software process running within the collection system 182, or it may run as a separate process. The priority module may be used to prioritize the data collected by the database management collection module in order to have more potentially dangerous or suspect URLs (or data) receive close inspection prior to the likely harmless URLs. In one embodiment, the priority module 200 may assign priority based on the collection source 194 from which the URL is received. For example, if a URL is received from a customer report, it may be designated with a higher priority. Similarly, if the URL is received from a web crawler accessing a domain or IP address or subnet known to host malicious content in the past, the URL may receive a high priority. Similarly, a potentially dangerous website identified by a honey client (discussed in further detail below) may also receive a high priority. The database management collection module 190 may also include a data selection module 202 which may work with the priority module 200 to determine whether identified URLs should be tagged as candidate URLs for categorization. In one embodiment, the data selection URL may provide a user interface for receiving search parameters to further refine the prioritized data by searching for data based on priority and content.

As indicated above, the collection module may also include a data download module 204. The data download module 204 may be configured to identify URLs to visit and to download data and content from the visited URLs. The data download module 204 may work in conjunction with various subsystems in the database management collection module 190 to retrieve data for the URL/content database 180. One such subsystem is the webcrawler module 206. The webcrawler module 206 may be a software application configured to access websites on the Internet 112 by accessing web pages and following hyperlinks that are included in those pages. The webcrawler module 206 may be configured with several concurrent processes that allow the module to simultaneously crawl many websites and report the visited URLs back to the database management module URL/content database 180 as will be discussed in further detail below. The database management collection module 190 may also include a honey client module 208. The honey client module 208 is a software process configured to mimic the behavior of a web browser to visit websites in such a manner that is inviting to malicious code stored within the visited pages. The honey client module 208 may visit the web sites and track the behavior of the websites and download the content back to the URL/content database 180 for further analysis.

The database management collection module 190 may also include a third party supplier module 212 which is configured to receive URLs and associated content from third parties. For example, the third party module 212 may be configured to provide a website which may be accessed by the general public. The module may be configured to receive an input URL string which may then be entered into the URL/content database 180. In some embodiments, the third party module may also be configured to receive e-mails from private or public mailing lists, and to identify any URL data embedded within the e-mails for storage in the URL/content database 180.

The database management collection module 190 may also include a gateway server access module 210. The gateway server access module is a software component or program that may be configured to regularly access the logging database 144 on the gateway server module 120 to download/upload all of the newly uncategorized web content identified by the logging database 144.

Referring back to FIG. 8, the collection system 182 may also include a data mining module 192. The data mining module 192 may be used to obtain additional data about URLs stored in the database management module's URL/content database 180. In many instances, the information supplied by the collection sources 194 to the database management collection module 190 and URL/content database 180 is limited to nothing more than a URL string. Thus, in order for the system to effectively categorize the content within that URL, more data may be necessary. For example, the actual page content may need to be examined in order to determine whether there is dangerous content embedded within the URL. The data mining module 192 is used to collect this additional necessary data about the URLs, and will be discussed in further detail below.

Figure 10:
FIG. 10 is an exemplary computer screen shot of a search engine request for websites associated with the search phrase "free screen savers."

As previously discussed, certain embodiments of the invention provide for the use of a content filtering module 149 to remove unwanted content from pages returned to a client workstation 116 in response to a user request. In one particular embodiment, search engine results may be intercepted by the gateway server module 120 and filtered to remove, prior to presentation to the user, undesired content such as URL links which point to web pages having objectionable content from the returned pages. FIGS. 10-12 provide an illustration of how the various components of the gateway server module may be configured to intercept, filter, and/or modify objectionable content returned in search engine query results.

Referring now to FIG. 10, an example of an entry form 220 for a search engine 113 is provided. The entry form 220 includes a text box 222 into which a user may enter search parameters 223. In the example provided, the search parameters include the words "free screen savers." The search entry form 220 may also include a search type selection 224. In the example provided, the search type selection 224 includes various user-selectable options such as Web, Images, Video, News, Maps, etc. As shown in FIG. 10, the option for "Web" is selected, indicating that the search will look for web pages to return to the user. The entry form 220 may also include a submission element 226. The submission element 226 allows the user to submit their search to the search engine 113.

When a user submits a search request to the search engine 113, the search engine 113 typically searches its databases and indexes to determine the web pages or other items which are relevant to the submitted search. The results are returned to the user in a web page which displays data about the relevant pages and URL links which allow the user to access the identified pages. As noted above in connection with FIG. 3, the gateway server module 120 may be configured to intercept the returned search engine results and analyze their content.

Figure 11A:
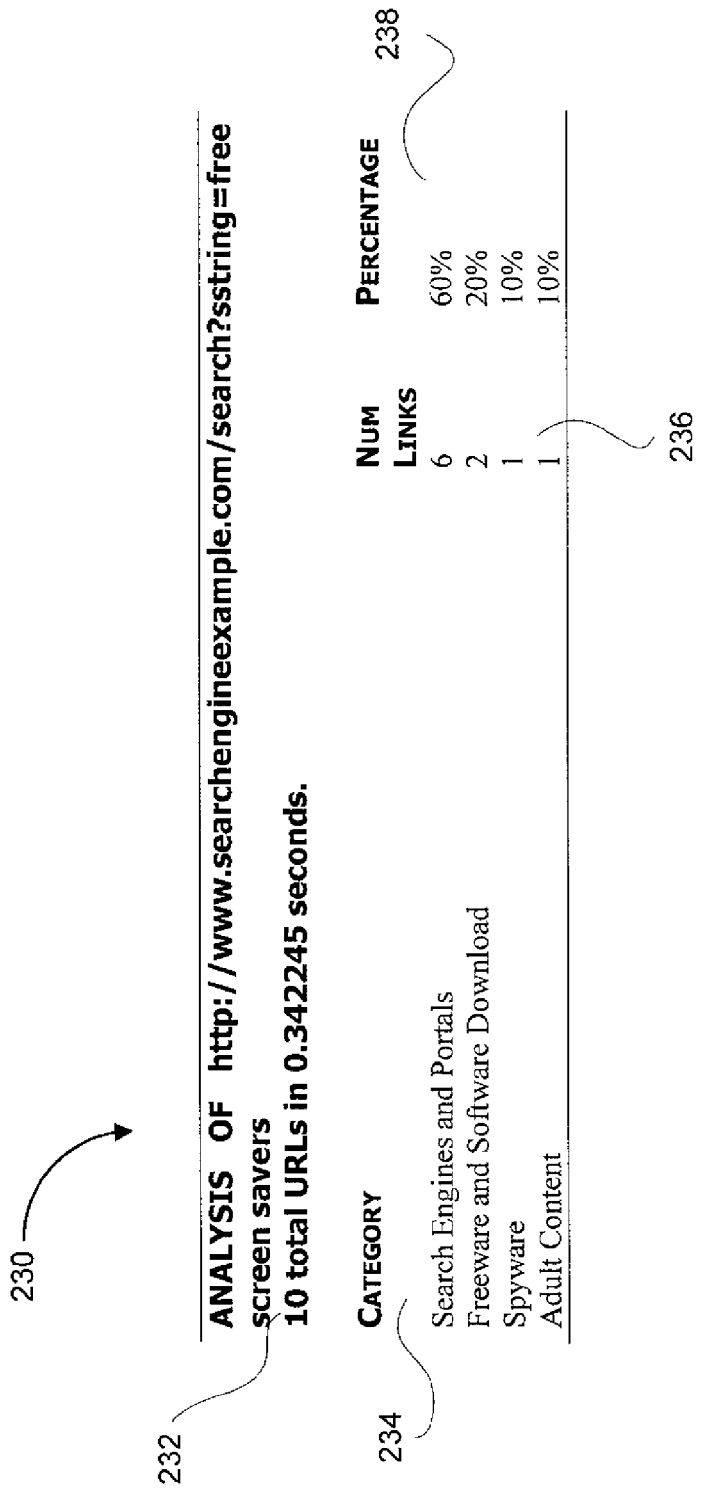
FIG. 11A is an exemplary table summarizing the results received from the search engine in response to the search engine request of FIG. 10.

FIGS. 11A and 11B provide examples of the analysis performed by the gateway server module 120 on a page returned by a search engine 113 in response to the search shown in FIG. 10. In many embodiments, this information will be hidden from the user and the results of the analysis will be largely transparent. In other embodiments, however, the results of the analysis may be presented to the user so that they have an indication when search results have been removed from their query. In other embodiments, this information may be presented in a report to a network manager. The data presented in the report may be used to analyze how the gateway server module 120 handles certain types of searches and helps to determine how to configure the policy module 142 in such a way as to prevent it from blocking or removing content that is not objectionable.

With reference to FIG. 11A, a chart 230 provides an example of a category breakdown of returned search results. The chart 230 includes a header area 232. The header area 232 may include information related to the data returned to the client computer 16 which was intercepted by the gateway server module 120. In the example provided, the header 232 includes information describing the URL of the intercepted page. The header 232 also includes a listing of the number of URLs analyzed by the gateway server module 120 and the time taken for the analysis. In embodiments where the intercepted data includes search engine results, the information in the header 232 may also include the search string submitted to the search engine 113.

The chart 230 may also include one or more columns including information about the specific URLs intercepted by the gateway server module 120. In the example provided in FIG. 11A, the breakdown of the intercepted content includes a list of the frequencies of the categories for the intercepted URLs. A first column 234 includes a description of the category. A second column 236 includes the number of links found in the intercepted content which are in the category. A third column 238 may include the percentage share of the links in each category.

Referring now to FIG. 11B, a link analysis chart 250 provides more detailed information about each of the URL links intercepted by the gateway server module 120 and analyzed by the content filtering module 149. The link analysis chart 250 may include several columns which list information about each intercepted item. A first column 252 may include the item type such as "a,href" for URL links, "img src" for embedded image files, and the like. The chart 250 may also include a second column 254 in which each analyzed URL is listed. The chart 250 may further include a third column 256 which specifies the action taken with respect to each data item such as "Observe", "Allow", or "Block." The link analysis chart may also include a fourth column 258 for each item which lists the category of the URL in the link, along with a fifth column 260 which may include a numeric code representative of the category in the fourth column 258.

Figure 12A:
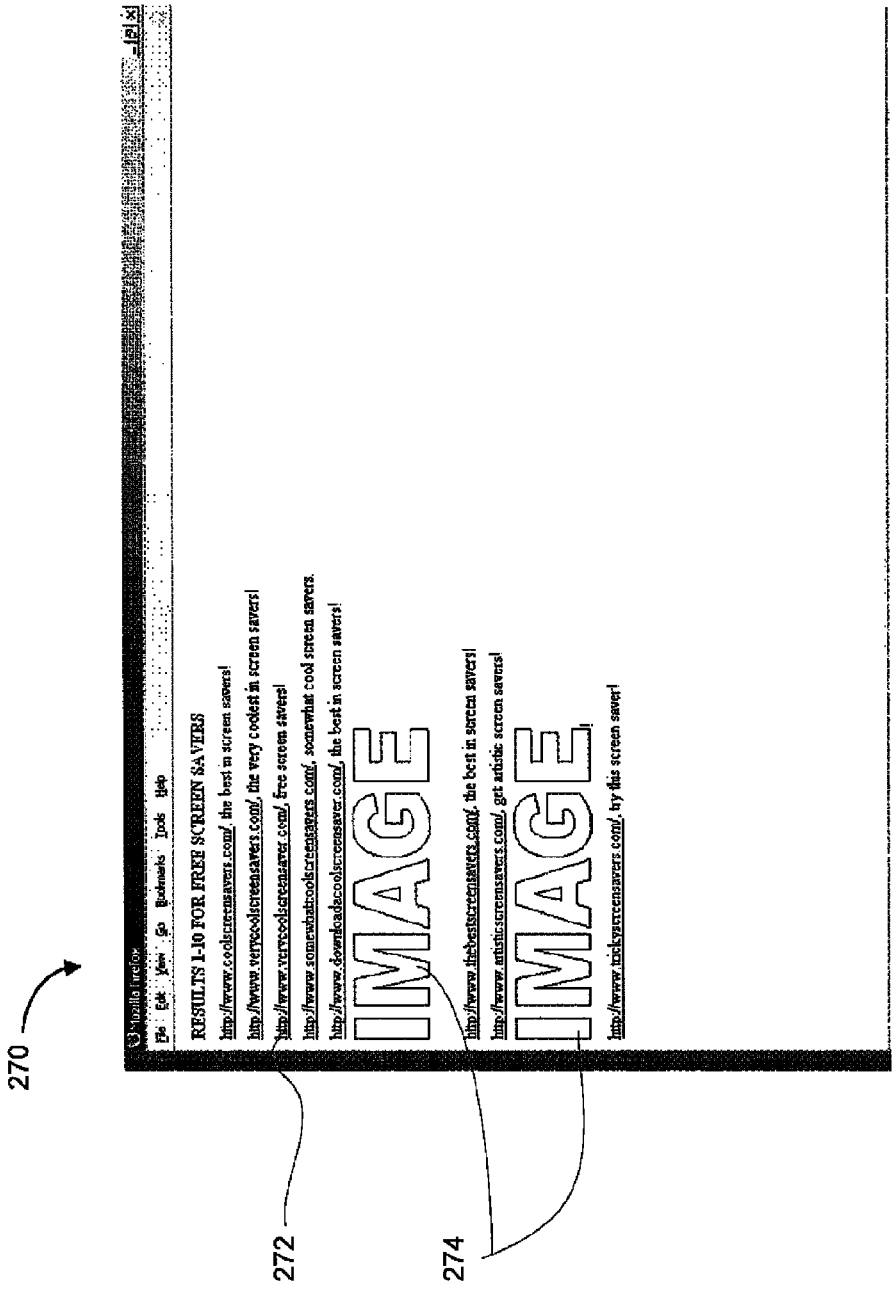
FIG. 12A is an illustration of how the URLs listed in FIG. 11B would appear to the user that requested websites associated with the search phrase "free screen savers."
Figure 12B:
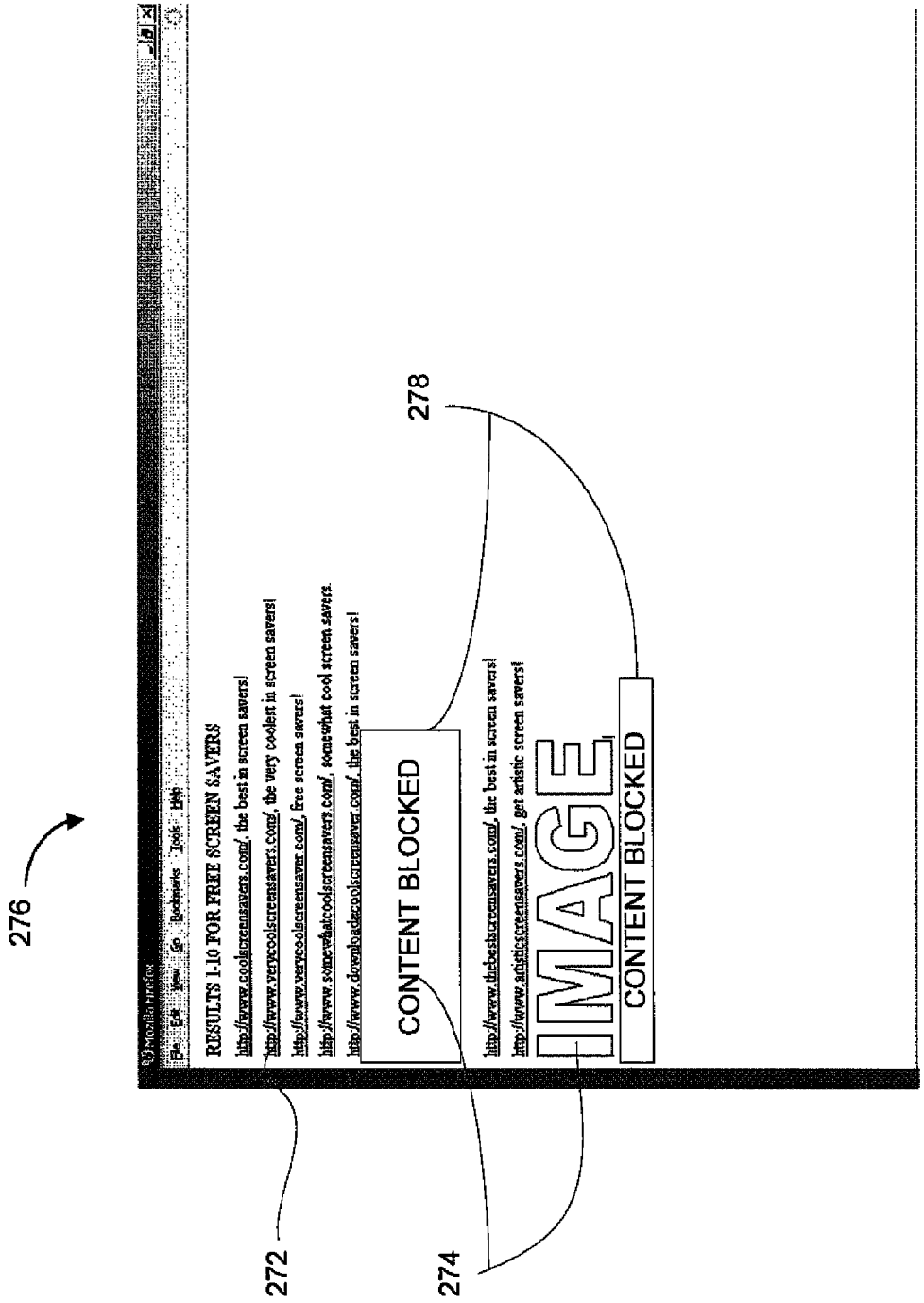
FIG. 12B is an illustration of how the URLs listed in FIG. 11B would appear to the user that requested websites associated with the search phrase "free screen savers" after being filtered by the system of FIG. 1.

FIGS. 12A and 12B are screen shots of unfiltered and filtered search engine results, respectively. FIG. 12A is an illustration of how the URLs listed in FIG. 11B would appear to the user that requested websites associated with the search phrase "free screen savers." The unmodified search results page 270 includes all of the content shown in FIG. 11B, without any of the content blocked or removed from the page. The unmodified page 270 includes URL links 272 which lead to the web pages identified by the search engine 113 as being relevant to the search request. The unmodified page 270 also includes images 274 which are embedded in the page. The images 274 may include data stored by the search engine 113 itself, or they may include image files which are embedded in the page content from another web site.

FIG. 12B is an illustration of how the URLs listed in FIG. 111B would appear to the user that requested websites associated with the search phrase "free screen savers" after being filtered by the system of FIG. 1. FIG. 12B illustrates a modified search results page 276. In the embodiment shown, the gateway server module 120 has intercepted the unmodified search results page 270 described in FIG. 12A, and has identified objectionable content (or URL links leading to objectionable content) within the search engine results. As shown in FIG. 12B, the modified page 276 includes several unmodified URL links 272 returned from the search engine 1113. As noted above, the content filtering module 149 and the gateway server module 120 do not modify these links based on their categorization in the URL/content database 146 and the policies defined and implemented through the policy module 142.

The modified page 276 also includes additional URL links which have been removed or not displayed by the gateway server module 120. In the embodiment shown, the content of the URL links has been replaced by content blocking notifications 278 which provide notification to the user that the page content has been modified to remove objectionable content. In some embodiments, the notification 278 may include text indicating the reason why the content was removed. For example, the notification may indicate that the URL link would access a page categorized as adult content in the URL/content database 146 and that the policy module 142 has been configured to block such content. In other embodiments, the modified page 276 may not provide an indication that the content has been modified. In such an embodiment, the links and their associated data may be removed in a manner that is transparent to the user. This alternate implementation will be discussed in further detail below with respect to FIGS. 14 and 15.

Figure 13:
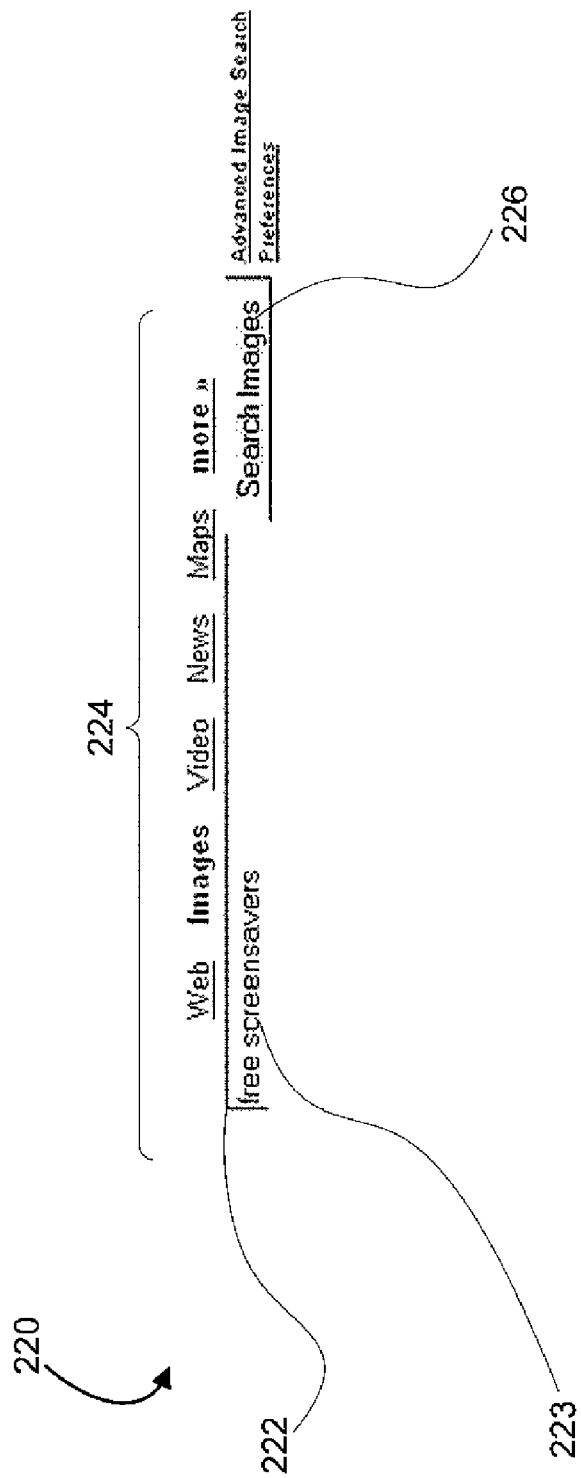
FIG. 13 is an exemplary computer screen shot of a search engine request for image files associated with the search phrase "free screen savers."
Figure 14:
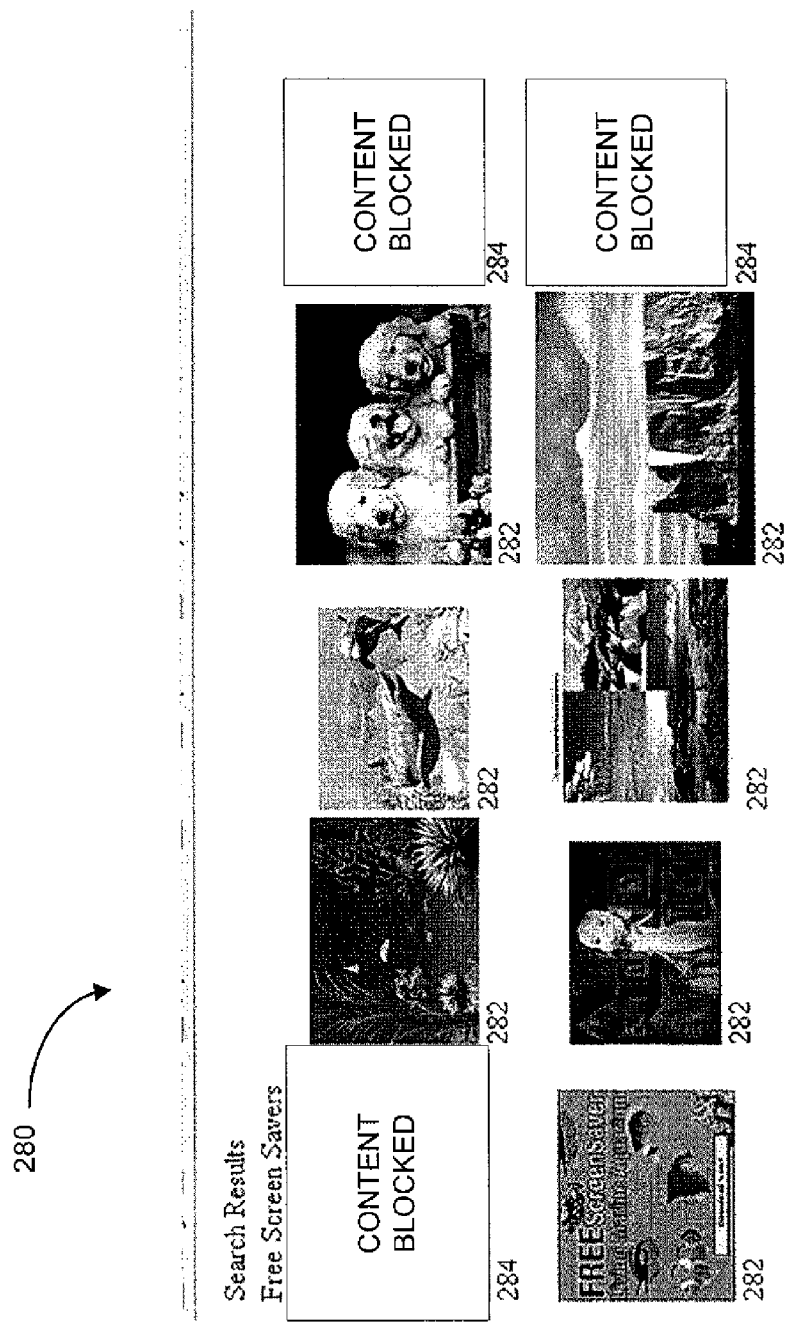
FIG. 14 is a partial listing of the image files returned by the search engine in response to the search parameters outlined in FIG. 13 with the system of FIG. 1 identifying objectionable image files by blocking their contents from view.
Figure 15:
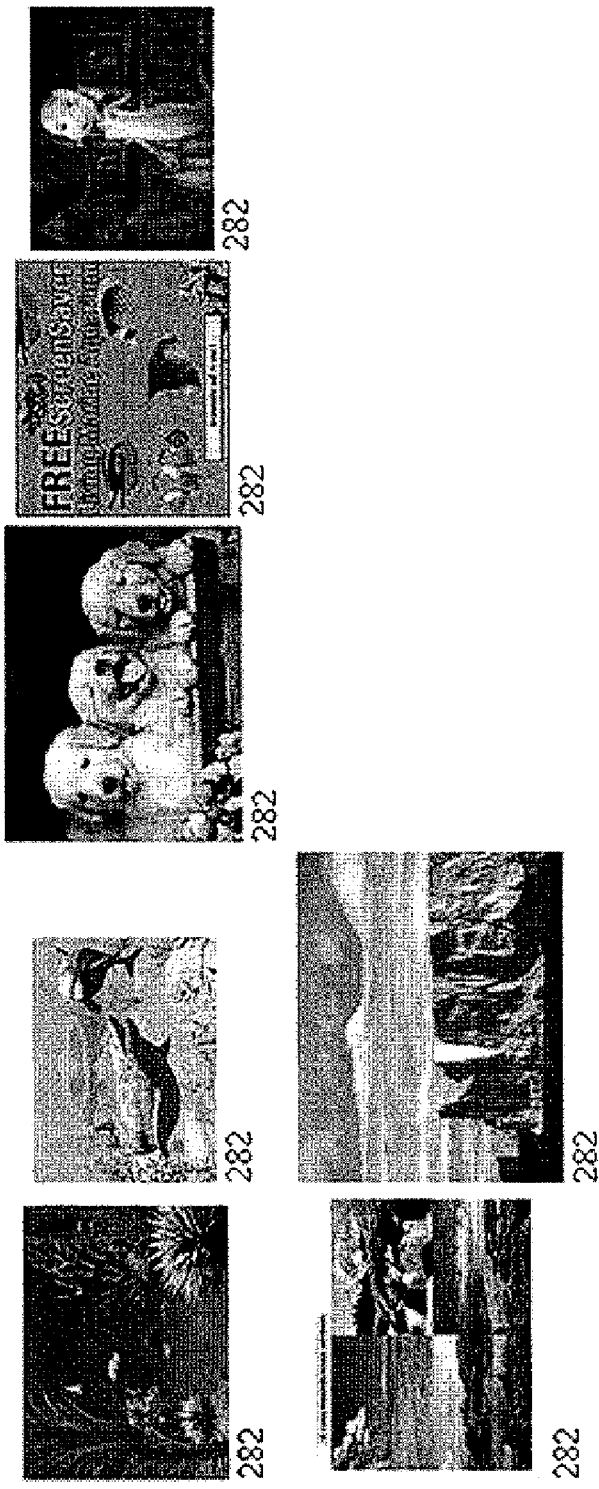
FIG. 15 is a partial listing of the image files returned by the search engine in response to the search parameters outlined in FIG. 13 with the system of FIG. 1 not displaying the objectionable image files to the user.

As discussed previously, various types of objectionable content may be filtered from data sent in response to network requests. In yet another aspect of the invention, embedded multimedia data may be removed from web pages prior to presentation to the requesting user. FIGS. 13-15 illustrate one embodiment in which the various components of the gateway server module 120 block image data based on the policies defined in the policy module 142 and categorization of the images in the URL/content database 146.

FIG. 13 is an exemplary computer screen shot of a search engine request for image files associated with the search phrase "free screen savers." The search entry form 220 from FIG. 10 is also used in FIG. 13. Unlike the example in FIG. 10 where the search type selection 224 was set to "Web", in the embodiment shown in FIG. 13, the search type selection 224 is set to "Images." The selection of images is indicated by the boldface text and by the text in the form submit button 226 which indicates that the search will search for images. After typing the search parameters 223 into the text box 222, and submitting the search to the search engine 113 by actuating the search button 226, the search engine 113 performs the search operation and returns results to the user. Unlike the previous search described in connection with FIGS. 10-12, the results returned from this search are in the form of image data rather than simple text strings. Before the returned page reaches the client workstation 116, the gateway server module 120 intercepts the returned results.

FIG. 14 is a partial listing of the image files returned by the search engine 113 in response to the search parameters outlined in FIG. 13 with the system of FIG. 1 identifying malicious image files by blocking visual access to the image files. FIG. 15 is a partial listing of the image files returned by the search engine 113 in response to the search parameters outlined in FIG. 13 with the system of FIG. 1 not displaying the objectionable image files to the user. FIGS. 14 and 15 provide two examples of how the content filtering module 149 may modify the returned image data. In both instances, the pages are modified according to the policies as defined by the policy module 142 and categorization of the returned image content.

Referring now to FIG. 14, the modifications to the image search page 280 performed by the content filtering module 149 are visible to the user and shown as blocks of disallowed data. The page 280 includes allowed images 282 returned by the search engine 113 and unobstructed by the gateway server module 120, and also includes notifications of blocked images 284. In the illustrated embodiment, the blocked images 284 are replaced by a display element notifying the user that the image has been blocked.

As discussed above, in some embodiments, the gateway server module 120 may intercept incoming web content and remove objectionable content without notifying the user. FIG. 15 is a partial listing of the image files returned by the search engine 113 in response to the search parameters outlined in FIG. 13 with the system of FIG. 1 not displaying the objectionable image files to the user. Unlike the embodiment shown in FIG. 14 in which the blocked content was identified in the modified page 280, in this embodiment, the blocked images 284 are removed from the page by the gateway server module 120 without notifying the user. Thus, the page delivered to the client computer 116 by the gateway server module 120 has been modified to remove the objectionable content unbeknownst to the user of the client computer 116. In previously described embodiments, the intercepted content was the returned results from a search engine request. However, as one of skill in the art would readily appreciate, in other embodiments, the functionality of the gateway server module 120 may be applied to many different content types. In one such alternative embodiment, the gateway server module 120 may be configured to intercept web feed content sent in response to a request by web feed software stored on a client workstation 116.

Figure 16A:
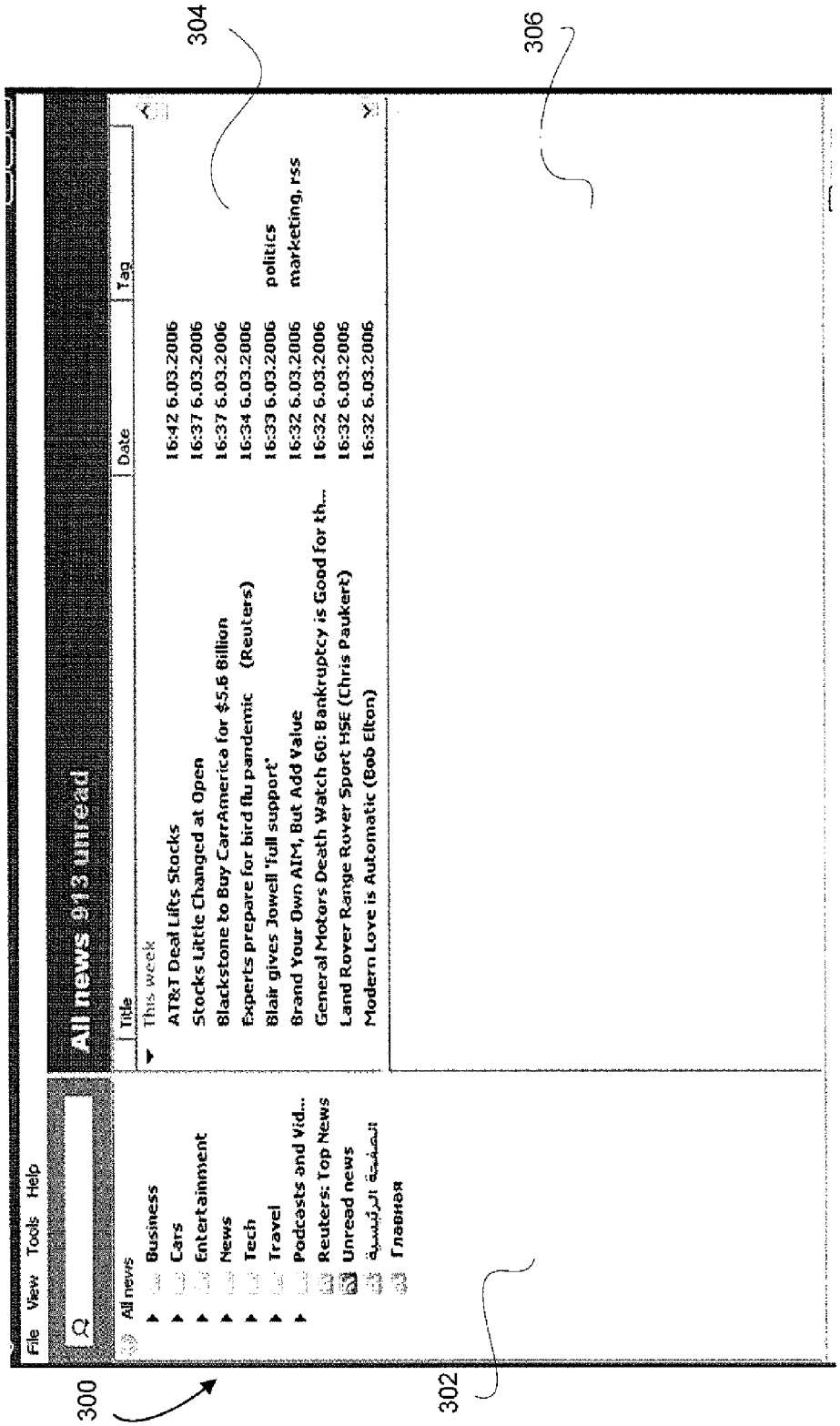
FIG. 16A is an exemplary screen shot of the results returned by a search engine search for web feed content and includes a partial listing of the contents of the folder labeled unread news.

Typically, the web feed content will take the form of an XML file. As discussed previously, a client computer 116 may include software for accessing syndicated web content. FIG. 16 provides an illustration of how content requested by web feed software may be filtered by the gateway server module 120. FIG. 16A is an exemplary screen shot of the results returned by a search engine search for web feed content and includes a partial listing of the contents of the folder labeled unread news in a web feed interface 300. The web feed interface 300 may include a navigation area 302, an item list area 304, and a preview area 306. The navigation area 302 allows the user to navigate to content that has been downloaded into the web feed reader software. The item area 304 may include a list of items which include URL links to content. Each item in the list may include a title which provides a summary of the content that is linked to the item. The preview area 306 allows the user to preview the content found at the URL link which is associated with each content item.

Figure 16B:
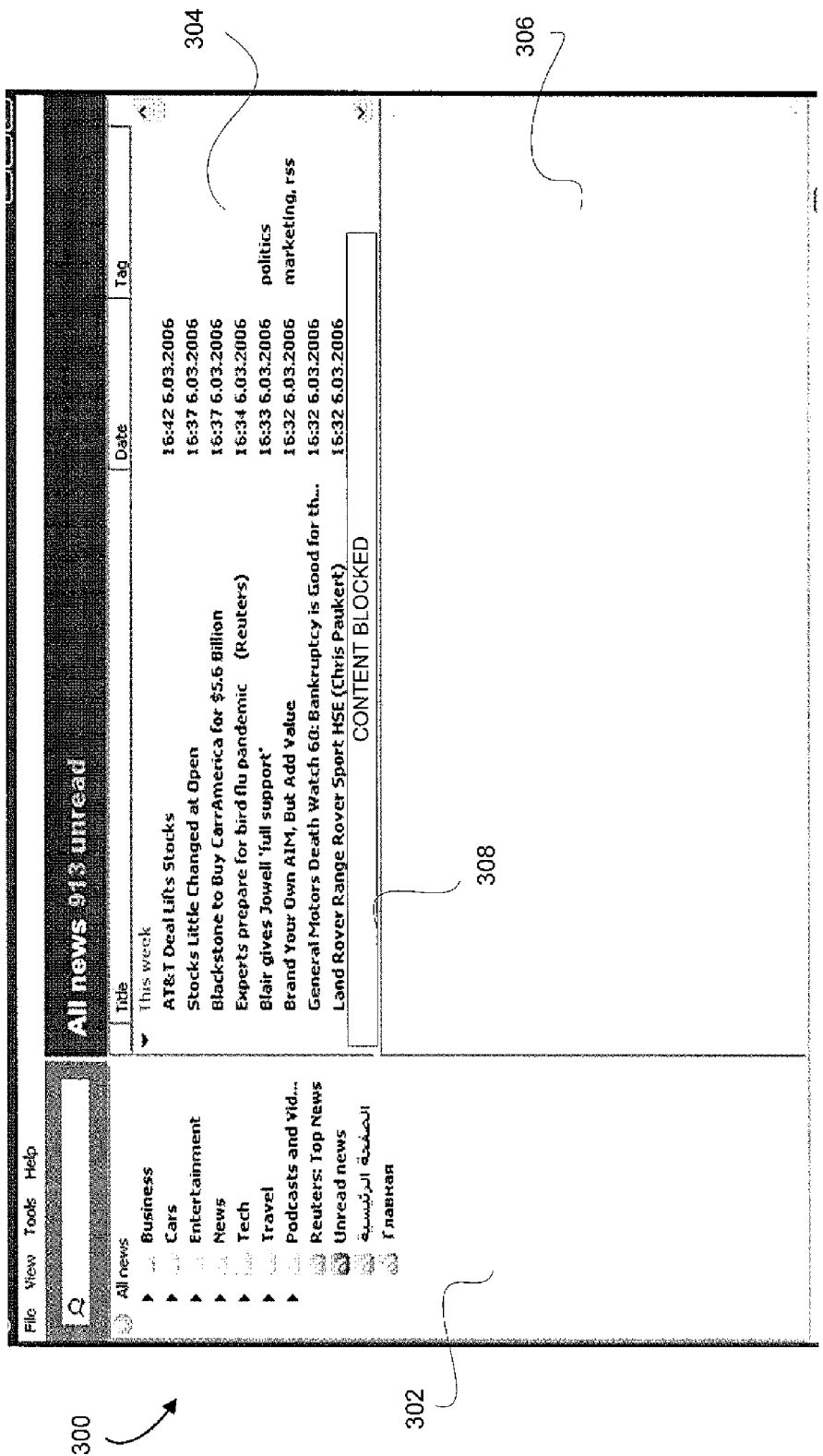
FIG. 16B is an exemplary screen shot of the results from FIG. 16A with the system of FIG. 1 identifying malicious web feed content files by placing a box over the file.

FIG. 16B is an exemplary screen shot of the results from FIG. 16A with the system of FIG. 1 identifying objectionable web feed content files by placing a box over the file in the web feed reading interface 300. As noted above, each item in the list area 304 includes a URL link to web content. When the web feed reader requests content from a web feed such as a syndicated website 115, the web feed send the requested content to the web feed reader software. While the requested content is in transit to the client computer 116, the gateway server module 120 may intercept the content and compare it to data stored in the URL/content database 146. Based on the configuration of the policy module 142 and the content filtering module 149, the content may be removed from the web feed by modifying the XML page sent from the content provider. In the example shown in FIG. 16B, one of the content items has been removed from the list area 304. Replacing the removed content item is a notification 308 that the content item has been removed from the web feed.

Figure 17:
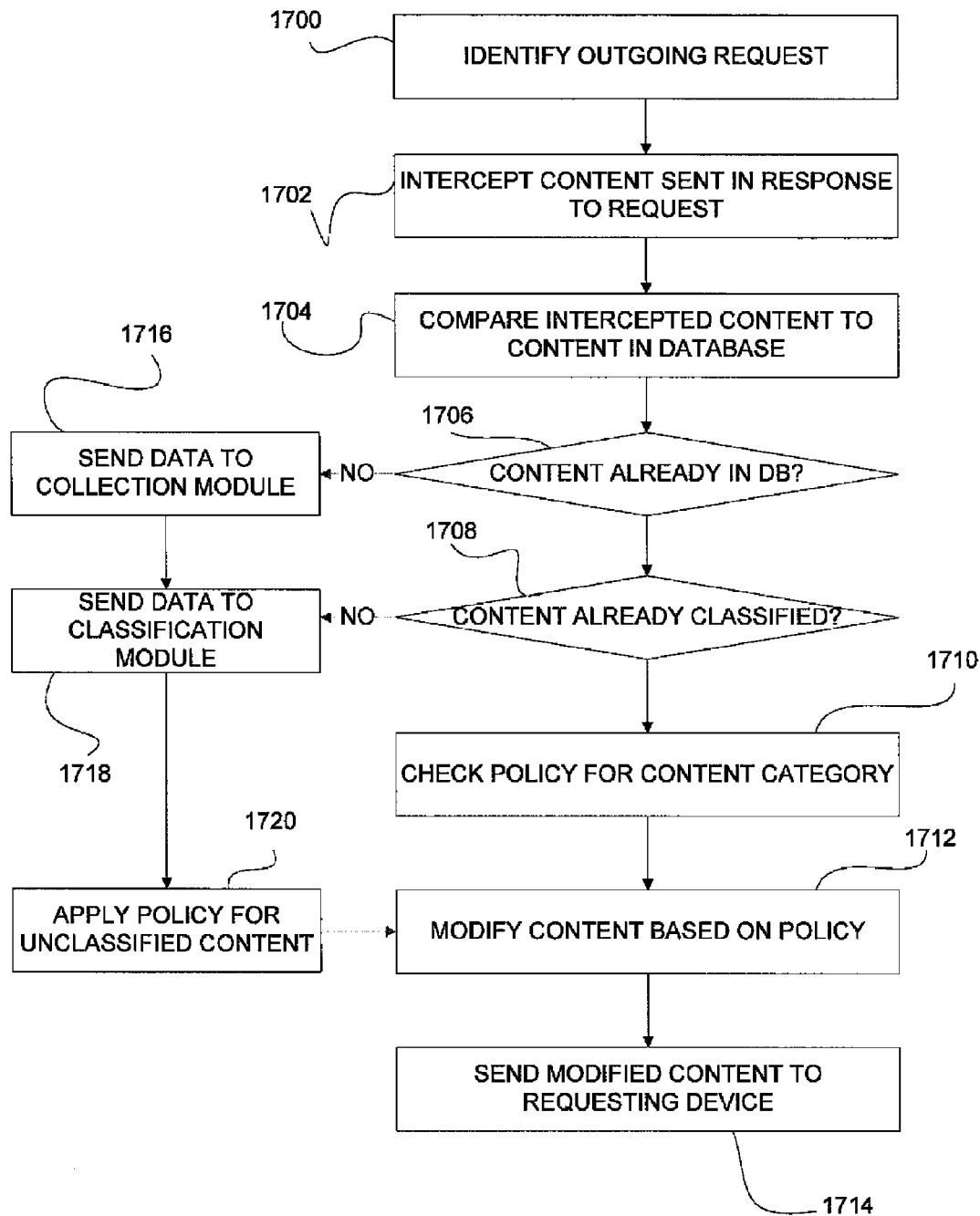
FIG. 17 is a flowchart depicting an exemplary method of monitoring and/or modifying the results returned to a user in response to a request for data.

FIG. 17 is a flowchart which describes a process for monitoring data sent to a workstation 116 in response to a network request from, for example, an Internet search engine 113 or web feed. The process begins at block 1700, where the gateway module identifies an outgoing network request. As noted previously, the outgoing network request may typically originate at the workstation 116, and may be a search request, a web feed request, or some other type of request. When data is sent back to the workstation 116 in response to the network request, the gateway server module 120 intercepts the returned data at block 1702. The process then moves to block 1704 where the intercepted data is compared to data stored in a database such as, for example, the categorized URL/content database 146. Next, the process moves to decision block 1706 where it is determined whether some or all of the intercepted data is represented in the database 146. If the intercepted data is not found in the database 146, the data is sent to a collection module at block 1716. The collection module may be a collection module 140 which is part of the gateway server module 120, or it may be a collection module 190 which is part of the database management module 114. Then, at block 1718, the collection module processes the data and then sends it to a scoring/classification system 186 where it may be classified and categorized according to its content.

If the intercepted data is found in the database 146, then the process moves to decision block 1708, where the system then determines whether the intercepted data has been classified in the database 146. If the intercepted data has not been categorized yet, process moves to block 1718, where the data is sent to the scoring/classification system 186 for classification and categorization. After the data is sent to the classification system 186, the process then moves to block 1720, where the unclassified/uncategorized content policy is applied to the intercepted data. Next, the process moves to block 1720 where based on the unclassified/uncategorized content policy, the content is modified (or possibly not modified) in accordance with the policy.

Returning now to block 1708, if the intercepted data has already been categorized, the process then moves to block 1710 where the policy module 142 determines, based on the category of the intercepted data, whether to modify or block the intercepted content. Next, at block 1712, the data is passed to the content filtering module 149 which modifies the content by either removing or blocking the objectionable content as identified in accordance with the policies defined in the policy module 142. Once the content filtering module 148 has completed its modifications of the intercepted page, the modified page is then sent to the originating workstation 116 at block 1714.

It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A method of monitoring data sent from a requested device to a requesting device, the method comprising:
    identifying, at a gateway server, an outgoing request from the requesting device, the outgoing request comprising a search request and the requested device comprising a search engine;
    intercepting, at the gateway server, content sent from the requested device in response to the outgoing request, the intercepted content comprising search results for display on a web page returned by the search engine, the search results comprising a list of uniform resource locators;
    determining categories of at least some of the intercepted uniform resource locators by comparing the at least some of the intercepted uniform resource locators to a portion of information from a categorized URL-content database, the information in the URL-content database based on at least:
        a record of a number of repeated requests for a web content referenced by a URL, the number exceeding a threshold;
        a priority associated with a collection source, the collection source configured to provide a URL referencing a web content and to provide data regarding the web content referenced by the URL; and
        an indication of whether a web content referenced by a URL comprises active content;
    modifying the content by removing at least one of the uniform resource locators from the list of uniform resource locators on the web page returned by the search engine based at least in part on the categories of the uniform resource locators in the search results; and sending the modified content for display on the requesting device.

2. The method of claim 1, further comprising sending the intercepted content to a collection module if the intercepted content is not already in the database.

3. The method of claim 2, further comprising collecting data related to the intercepted content not already in the database.

4. The method of claim 3, further comprising determining a candidate status for the one or more URL links not in the database based on the collected data.

5. The method of claim 1, wherein the list of uniform resource locators is identified by the search engine as being relevant to the search request submitted to the search engine.

6. The method of claim 1, wherein uniform resource locators categorized as being potentially harmful content are removed from the content when the content is modified.

7. The method of claim 1, wherein the gateway server computer is located on the requesting device.

8. The method of claim 1, wherein the URL-content database is located on a server separate from the gateway server.

9. The method of claim 1, wherein modifying the content is further based in part on instructions from a policy module, the policy module located on the gateway server.

10. A system for monitoring content sent from a first device comprising a search engine to a second device comprising a user workstation in response to a request by the second device for data from the first device, the system comprising:
    a gateway server module executed by a processor on a gateway server computer configured to:
        intercept the content sent from the first device to the second device, wherein the content comprises a collection of uniform resource locators sent in response to a search engine query, the search engine query being sent from the second device to the first device; and
        determine categories associated with uniform resource locators within the content based at least partially on a comparison of the intercepted content with a portion of data in a categorized URL-content database, the database configured to store data indicative of categorized uniform resource locators and uncategorized uniform resource locators, wherein the data in the URL-content database is based on at least:
            a record of a number of repeated requests for a web content referenced by a URL, the number exceeding a threshold;
            a priority associated with a collection source, the collection source configured to provide a URL referencing a web content and to provide data regarding the web content referenced by the URL; and
            an indication of whether a web content referenced by a URL comprises active content; and
    a content filtering module configured to modify the collection of uniform resource locators by removing at least some of the collection of uniform resource locators based at least in part on the categories.

11. The system of claim 10, wherein the gateway server module is further configured to send the intercepted content to a collection module if the intercepted content is not already in the database.

12. The system of claim 10, further comprising a collection module configured to collect data related to the intercepted content if the intercepted content is not already in the database.

13. The system of claim 12, further comprising a classification module configured to receive the intercepted content from the collection module and further configured to determine a classification for the intercepted content.

14. The system of claim 10, wherein the list of uniform resource locators is identified by the search engine as being relevant to the search request submitted to the search engine.

15. The system of claim 10, wherein uniform resource locators categorized as being objectionable content are removed from the content when the content is modified.

16. The system of claim 10, wherein the user workstation is the gateway server computer.

17. The system of claim 10, wherein the URL-content database is located on a server separate from the gateway server.

18. The system of claim 10, further comprising a policy module located on the gateway server computer, the policy module configured to provide instructions indicating what uniform resource locators to remove from the collection of uniform resource locators based on the categories associated with the uniform resource locators in the records of the database.

* * * * *

UNITED STATES PATENT AND TRADEMARK OFFICE
CERTIFICATE OF CORRECTION

PATENT NO.      : 8,015,174 B2                                          Page 1 of 1
APPLICATION NO. : 11/680484
DATED           : September 6, 2011
INVENTOR(S)     : Dan Hubbard It is certified that error appears in the above-identified patent and that said Letters Patent is hereby corrected as shown below:

On the title page under item (56), Other Publications, column 2, line 2, please delete "PCT77US2008/052522." and insert therefore, --PCT/US2008/052522.--.

At page 4, column 1, line 24, please delete "ftp.rocksoft.corn" and insert therefore, --ftp.rocksoft.com--.

At column 5, line 51, please delete "1115." and insert therefore, --115.--.

At column 7, line 33, please delete "URL," and insert therefore, --URL.--.

At column 8, line 16, please delete "VB Script," and insert therefore, --VBScript,--.

At column 13, line 42, please delete "111B" and insert therefore, --11B--.

At column 13, line 51, please delete "1113." and insert therefore, --113.--.

Signed and Sealed this
Fourteenth Day of February, 2012

David J. Kappos
*Director of the United States Patent and Trademark Office*